(12) United States Patent
Noda

(10) Patent No.: US 8,908,289 B2
(45) Date of Patent: Dec. 9, 2014

(54) IMAGE CAPTURING LENS AND IMAGE CAPTURING APPARATUS

(71) Applicant: FUJIFILM Corporation, Tokyo (JP)

(72) Inventor: Takayuki Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/041,576

(22) Filed: Sep. 30, 2013

(65) Prior Publication Data

US 2014/0029117 A1 Jan. 30, 2014

Related U.S. Application Data

(63) Continuation of application No. PCT/JP2012/002192, filed on Mar. 29, 2012.

(30) Foreign Application Priority Data

Mar. 30, 2011 (JP) .................................. 2011-076179
Mar. 26, 2012 (JP) .................................. 2012-069526

(51) Int. Cl.
  *G02B 13/04* (2006.01)
  *G02B 13/18* (2006.01)
  *G02B 9/60* (2006.01)
  *G02B 13/00* (2006.01)

(52) U.S. Cl.
  CPC ............ *G02B 13/18* (2013.01); *G02B 13/0045* (2013.01)
  USPC ............................ 359/714; 359/753; 359/770

(58) Field of Classification Search
  CPC .... G02B 13/0045; G02B 13/04; G02B 13/18; G02B 9/60
  USPC ................................... 359/714, 749–753, 770
  See application file for complete search history.

(56) References Cited

U.S. PATENT DOCUMENTS

| | | | |
|---|---|---|---|
| 5,774,279 A | 6/1998 | Kiriki et al. | |
| 5,781,350 A | 7/1998 | Tachihara et al. | |
| 6,088,172 A * | 7/2000 | Sato | .............................. 359/770 |
| 7,110,188 B2 | 9/2006 | Matsui et al. | |

(Continued)

FOREIGN PATENT DOCUMENTS

| | | |
|---|---|---|
| JP | 7-253535 | 10/1995 |
| JP | 9-222556 | 8/1997 |
| JP | 2002-303791 | 10/2002 |
| JP | 2004-318099 | 11/2004 |
| JP | 2004-318103 | 11/2004 |
| JP | 2004-318110 | 11/2004 |
| JP | 2010-008562 | 1/2010 |

OTHER PUBLICATIONS

International Search Report, PCT/JP2012/002192, Jun. 12, 2012.

*Primary Examiner* — Scott J Sugarman
(74) *Attorney, Agent, or Firm* — Young & Thompson

(57) ABSTRACT

Arranging a negative first lens, a positive second lens, a negative third lens, a positive fourth lens, and a negative fifth lens from the object side, in which the image side surface of the fifth lens has an aspherical shape with one or more inflection points and a concave shape toward the image side in a paraxial region, and, when the focal length of the entire lens system, radius of curvature of the image side surface of the first lens, radius of curvature of the image side surface of the second lens, overall optical length, focal length of $j^{th}$ lens, and Abbe number of $j^{th}$ lens are taken as f, R2, R4, TL, fj, and vj respectively, the image capturing lens is configured to simultaneously satisfy conditional expressions (1a): $-1.5<f/R2<1.6$, (2a): $-1.6<f/R4<0.05$, (3a): $0.95 \leq f4/f \leq 4.3$, (5a): $1.0 \leq TL/f \leq 2.2$, and (12b): $-2.0<\Sigma(fj/vj)/f<0.5$.

16 Claims, 12 Drawing Sheets

(56) References Cited

U.S. PATENT DOCUMENTS

| | | |
|---|---|---|
| 7,480,105 B2 | 1/2009 | Mori |
| 8,717,689 B2 * | 5/2014 | Chen .............................. 359/770 |
| 2004/0189833 A1 | 9/2004 | Magimori et al. |
| 2004/0189834 A1 | 9/2004 | Hagimori et al. |
| 2013/0107375 A1 * | 5/2013 | Huang et al. .................. 359/714 |
| 2013/0308206 A1 * | 11/2013 | Hsu et al. ...................... 359/714 |
| 2014/0029116 A1 * | 1/2014 | Tsai et al. ...................... 359/714 |

* cited by examiner

EXAMPLE 1

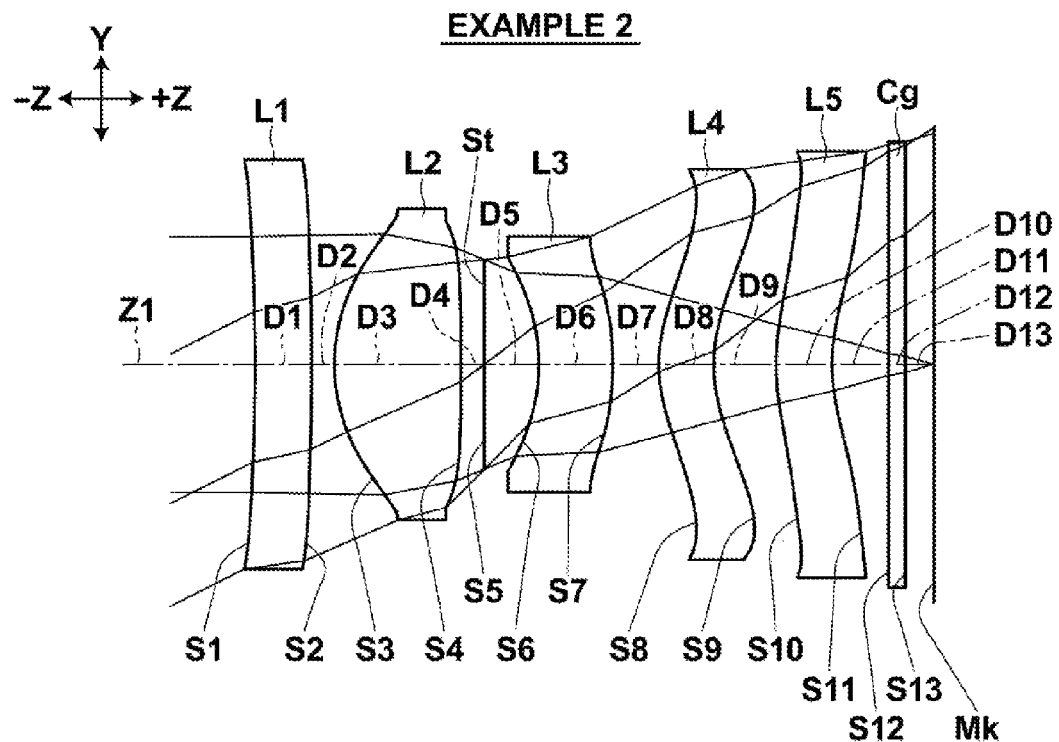
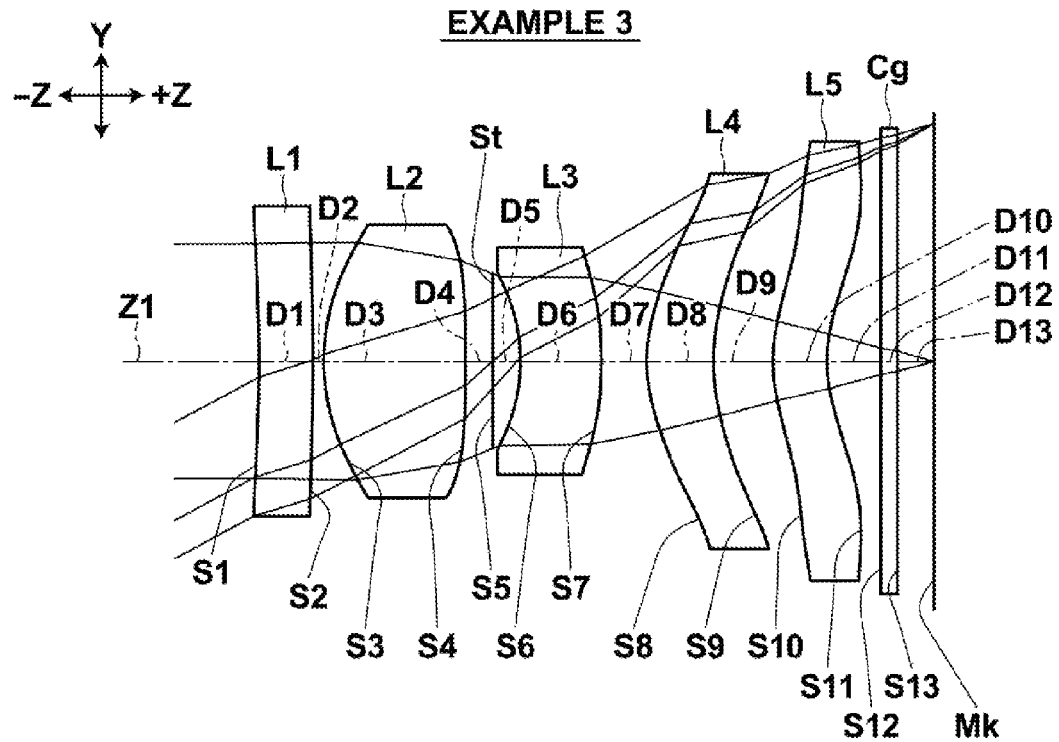

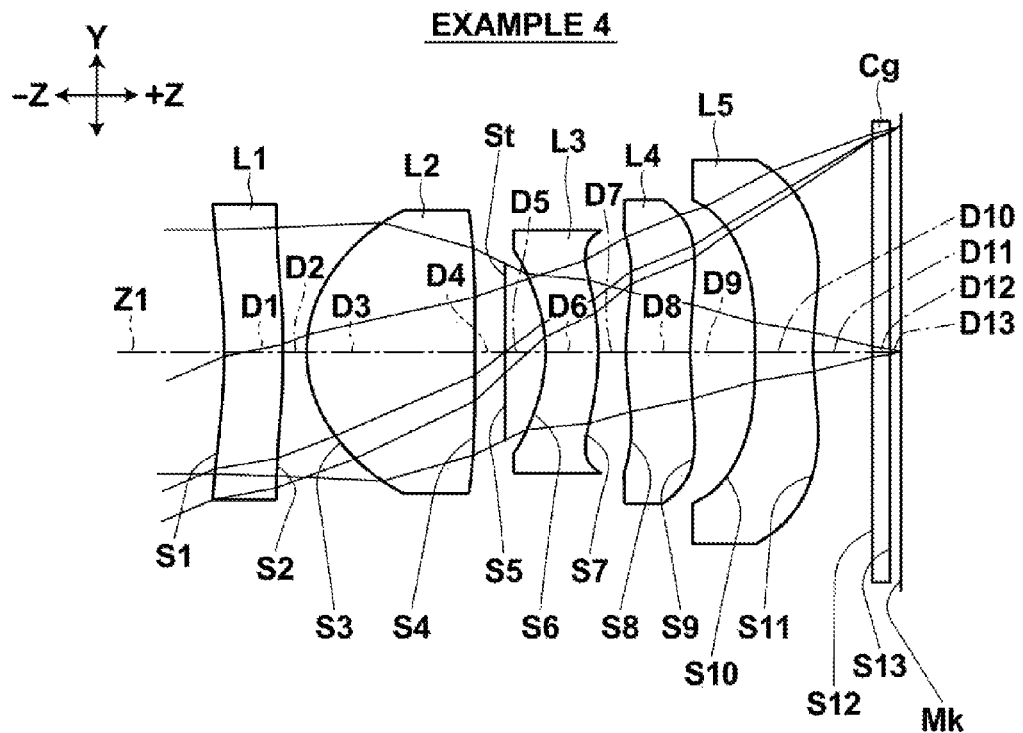
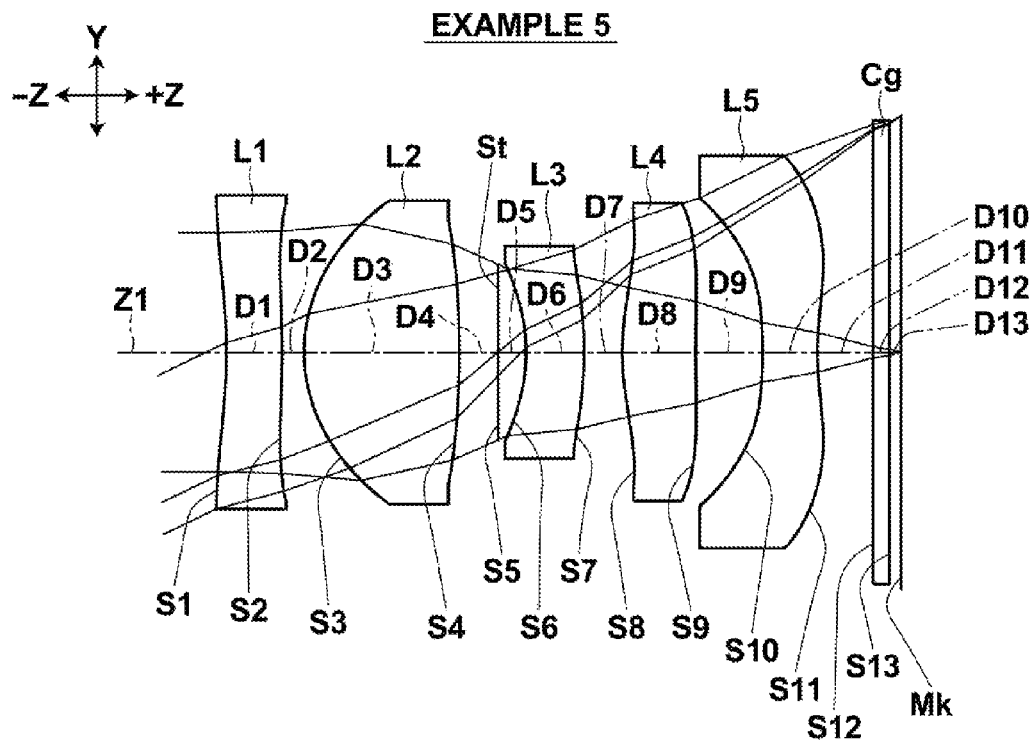

EXAMPLE 6

EXAMPLE 7

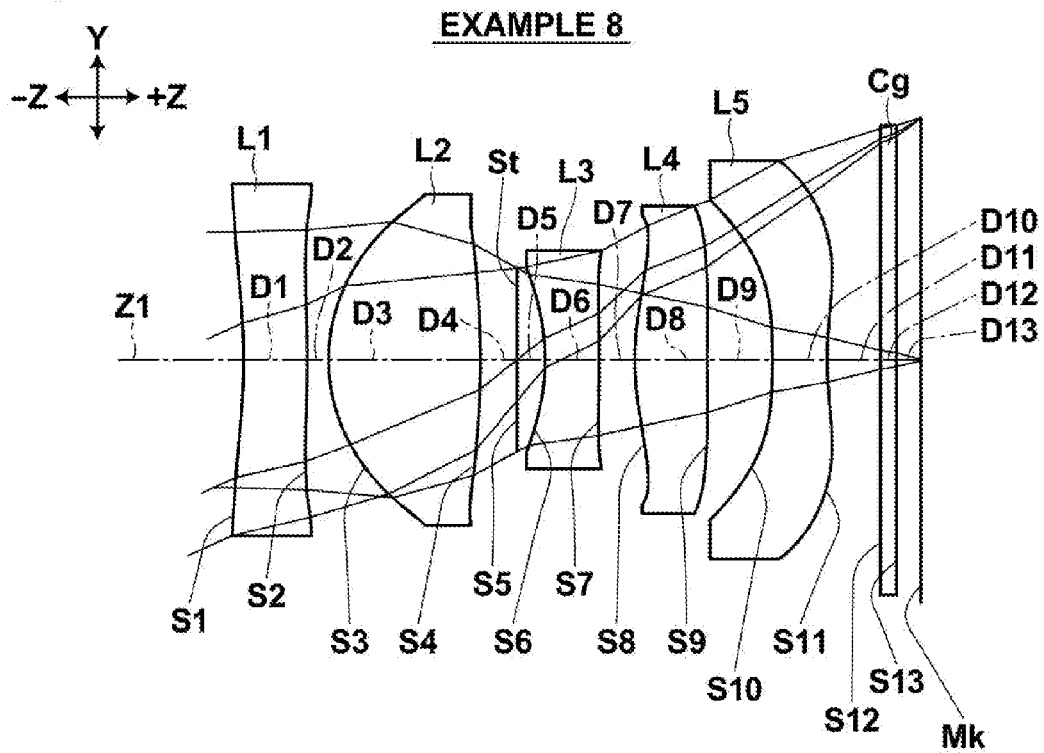
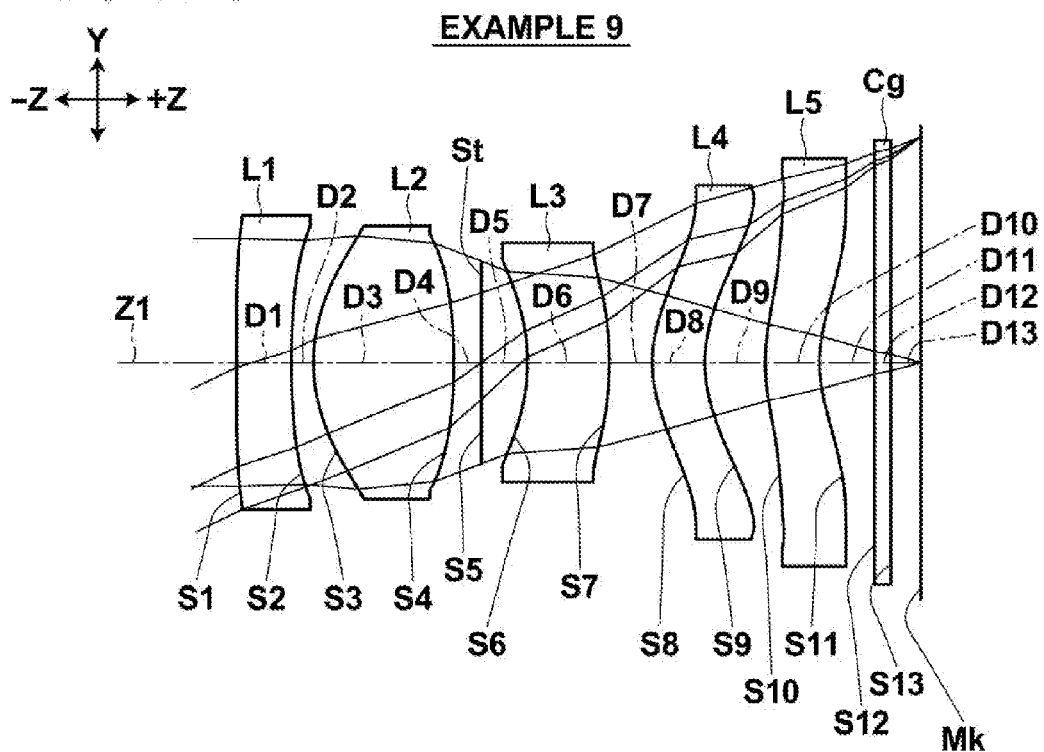

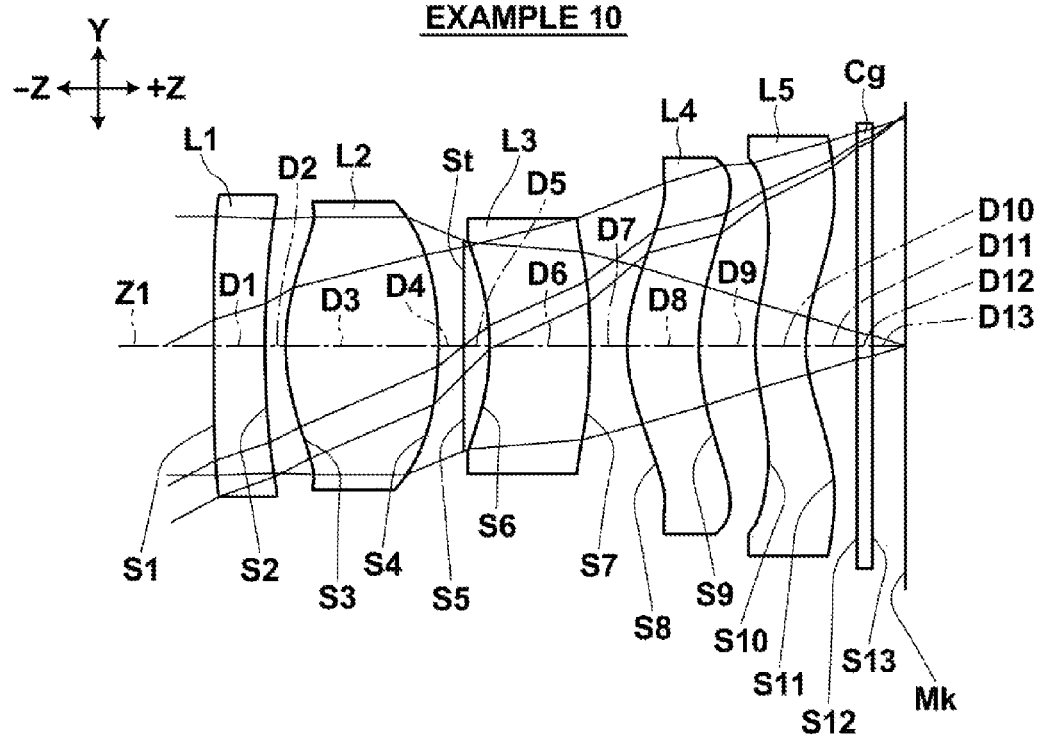
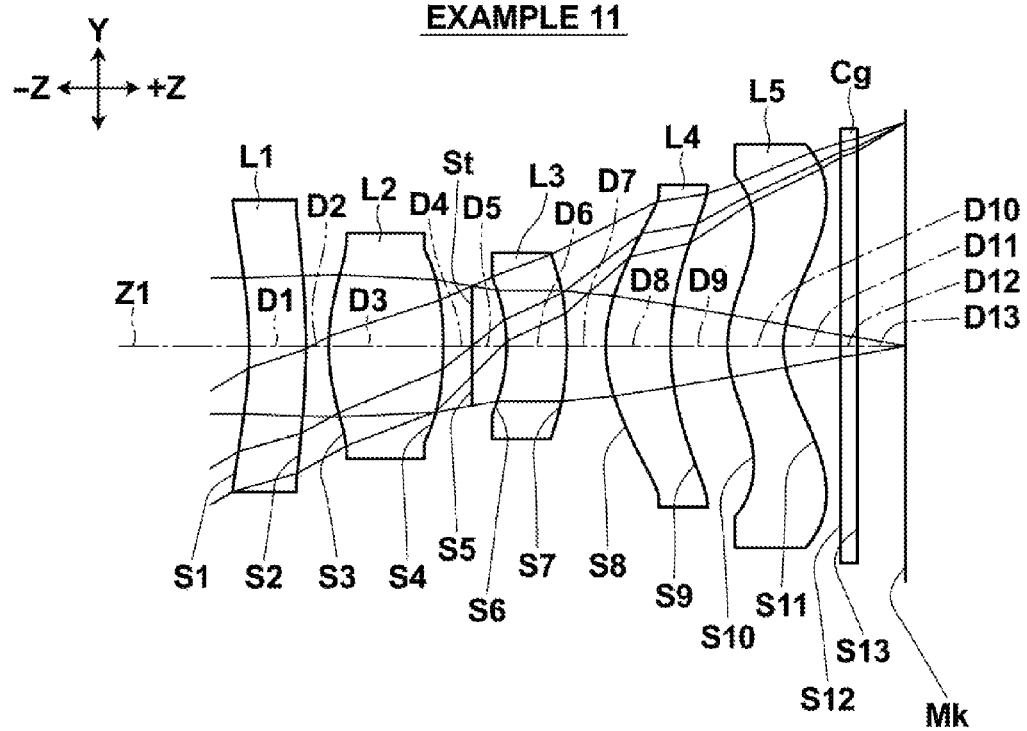

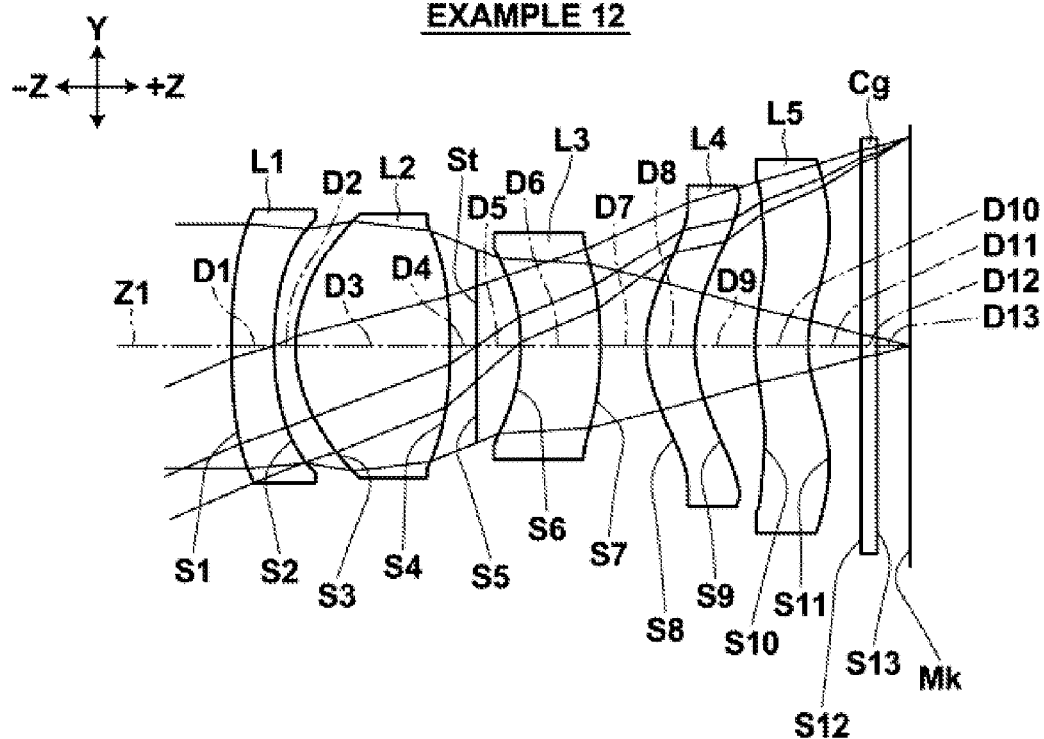
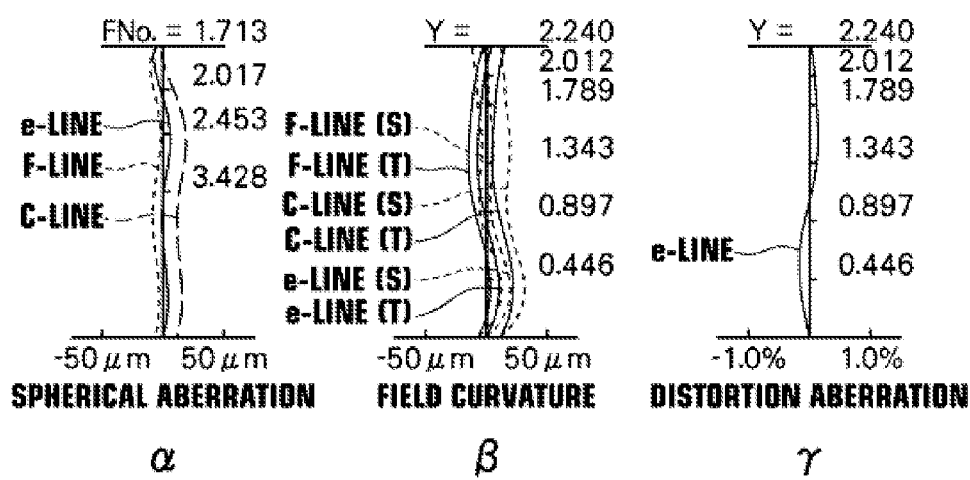

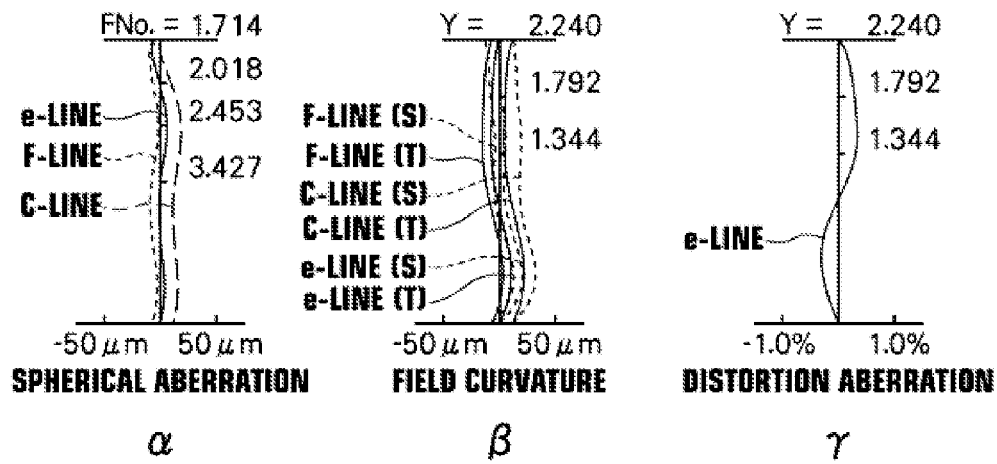
FIG.15 EXAMPLE 2
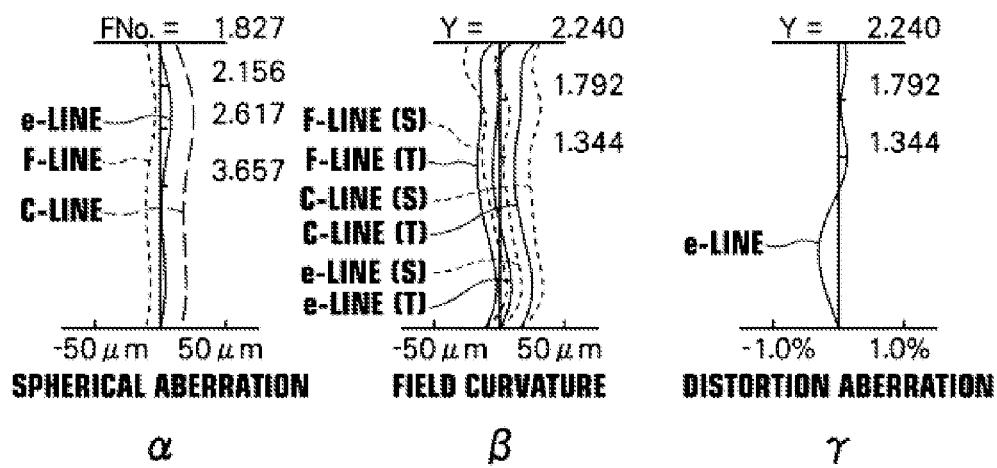
FIG.16 EXAMPLE 3
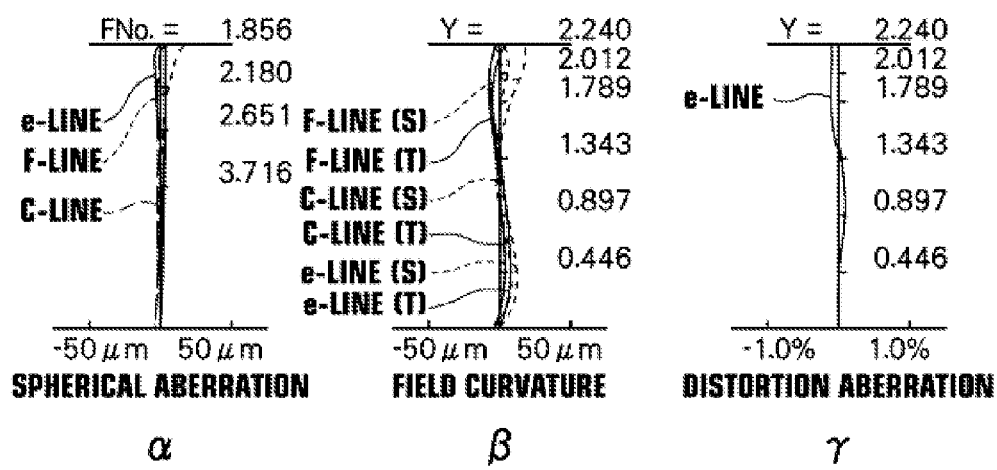
FIG.17 EXAMPLE 4

FIG.18 EXAMPLE 5
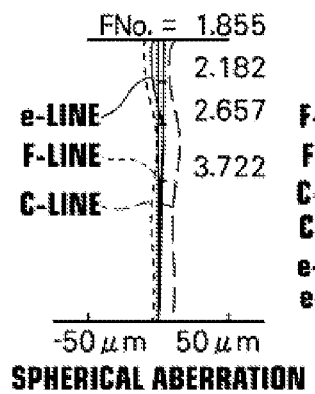
α
SPHERICAL ABERRATION
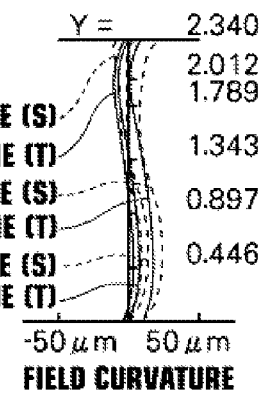
β
FIELD CURVATURE
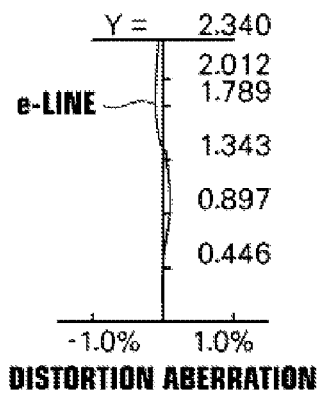
γ
DISTORTION ABERRATION
FIG.19 EXAMPLE 6
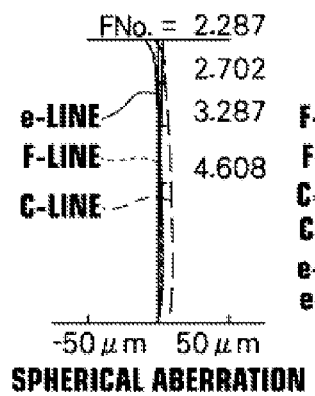
α
SPHERICAL ABERRATION
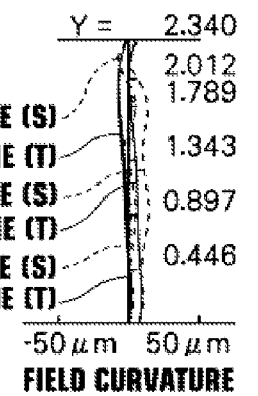
β
FIELD CURVATURE
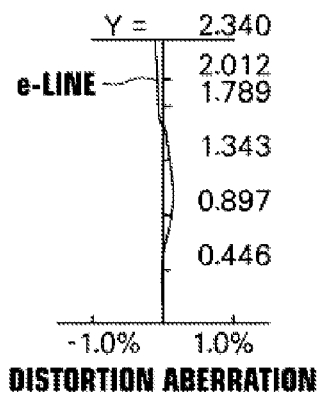
γ
DISTORTION ABERRATION
FIG.20 EXAMPLE 7
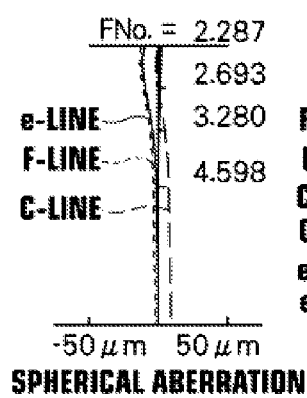
α
SPHERICAL ABERRATION
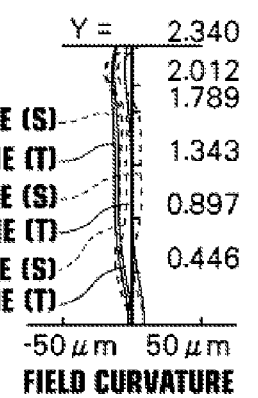
β
FIELD CURVATURE
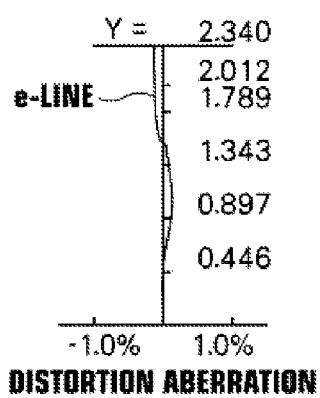
γ
DISTORTION ABERRATION

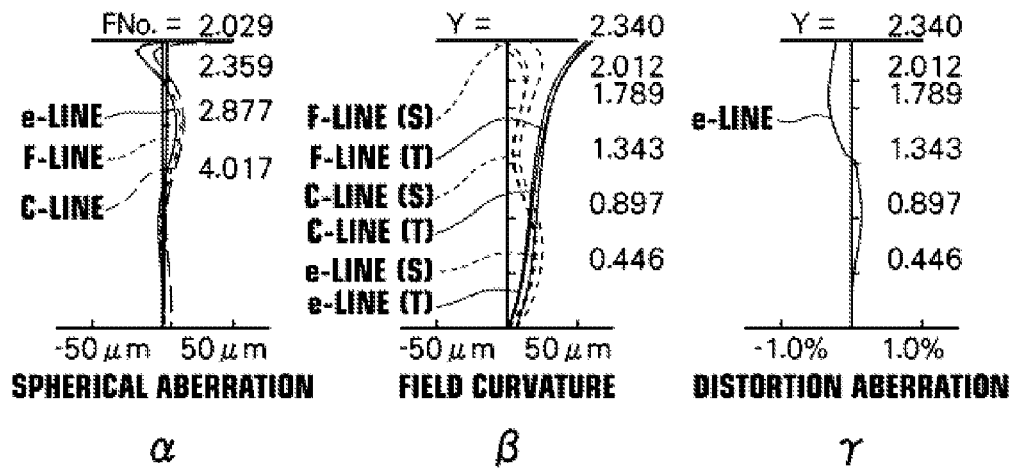
FIG.21 EXAMPLE 8
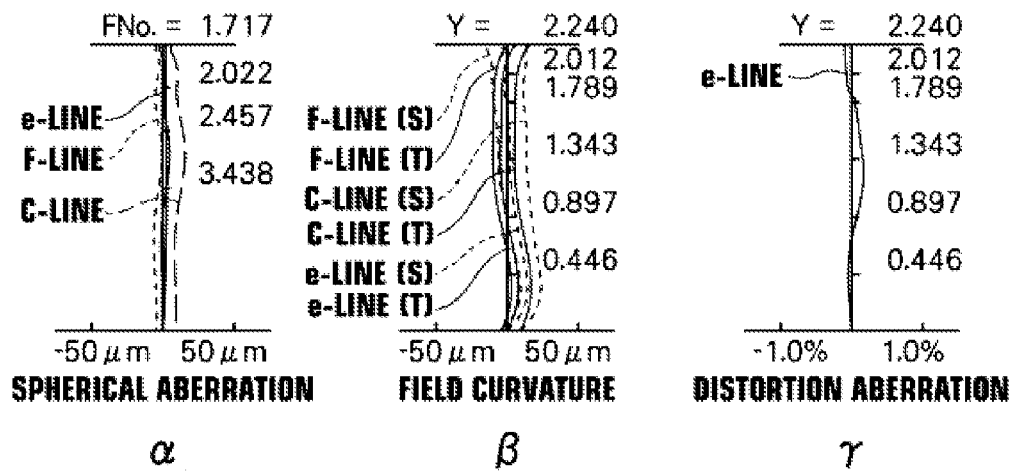
FIG.22 EXAMPLE 9
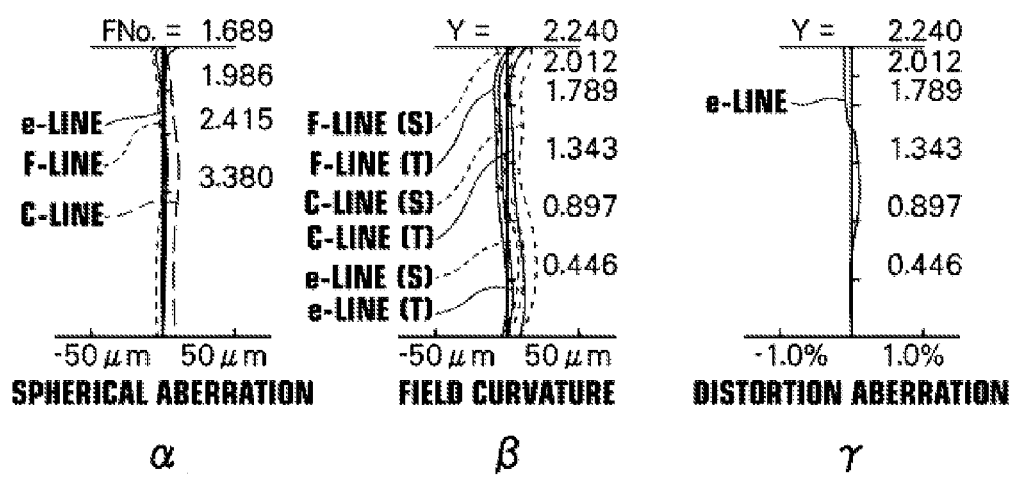
FIG.23 EXAMPLE 10

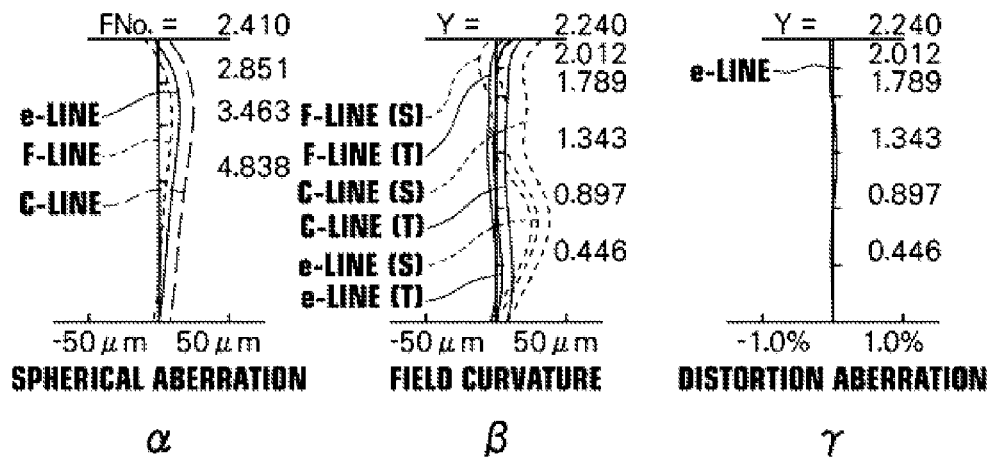
FIG.24 EXAMPLE 11
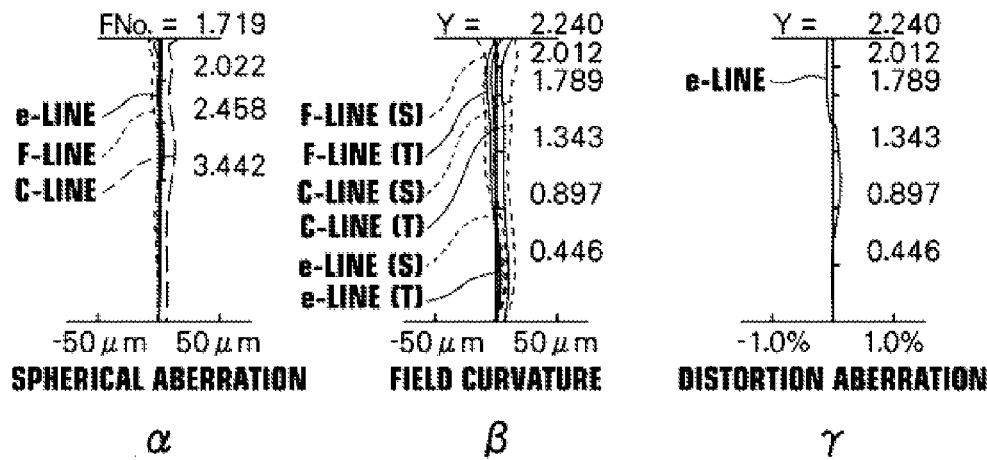
FIG.25 EXAMPLE 12

IMAGE CAPTURING LENS AND IMAGE CAPTURING APPARATUS

CROSS REFERENCE TO RELATED APPLICATIONS

This application is a Bypass continuation of PCT/JP2010/002192 filed on Mar. 29, 2012, which claims priority to Japanese Application Nos. 2011-076179 filed on Mar. 30, 2011 and 2012-069526 filed on Mar. 26, 2012. The entire contents of each of the above applications are hereby incorporated by reference.

TECHNICAL FIELD

The present invention relates to an image capturing lens for forming an optical image of a subject on an image sensor, such as a CCD (Charge Coupled Device), CMOS (Complementary Metal Oxide Semiconductor), or the like, and an image capturing apparatus provided with the image capturing lens to perform image capturing, such as a digital still camera, camera-equipped cell phone, personal digital assistance (PDA), smartphone, or the like.

BACKGROUND ART

Recently, along with the spread of personal computers to homes and the like, digital still cameras capable of inputting image information obtained by imaging a landscape, a person, or the like to a personal computer have been spreading rapidly. In addition, more and more cell phones and smartphones have built-in camera modules for inputting images. Such devices with image capturing capabilities employ image sensors such as CCDs, CMOSs, and the like. Recently, these types of image sensors have been downsized greatly and, consequently, image capturing devices as a whole and image capturing lenses to be mounted on such devices have also been required to have more compact sizes. At the same time, the pixel count of image sensors has been increasing, thereby causing a growing demand for improvement of image capturing lenses in resolution and performance.

As such image capturing lenses, those downsized by reducing the number of lenses, for example, to four or further to three are known. Further, as image capturing lenses used when a high resolving power is required, those with increased number of lenses, for example, those that use five lenses in order to improve the optical performance are known.

As image capturing lenses that use five lenses in order to improve the optical performance, those composed of a first lens having a negative refractive power, a second lens having a positive refractive power, a third lens having a negative refractive power, a fourth lens having a positive refractive power, and a fifth lens having a positive refractive power arranged in this order from the object side are known (refer to U.S. Pat. No. 7,480,105, Japanese Unexamined Patent Publication No. 2010-008562, and U.S. Pat. No. 7,110,188).

DISCLOSURE OF THE INVENTION

However, the image capturing lenses that use five lenses described above are difficult to obtain sufficient brightness because the resolving power is reduced if trying to increase the aperture to get sufficient brightness (for example, the image capturing lens of Patent Document 1 or the like is premised on an F-number of around 2.8).

Further, in the five element image capturing lenses described above, if trying to reduce the thickness (reduce the overall optical length), inhibition of various aberrations (e.g., chromatic aberration and distortion) becomes difficult, thereby causing a problem that a desired resolving power may not be obtained.

Still further, there is also a demand that, while maintaining the balance between the central region in which a main subject appears and the peripheral region in which a background appears, the image quality of the background be improved, and an image capturing lens capable of providing a satisfactory resolution also in a region where the diagonal angle of view becomes 50° or greater is sought.

The present invention has been developed in view of the circumstances described above and it is an object of the present invention to provide an image capturing lens which is bright and high resolution to a peripheral angle of view with reduced overall length, and an image capturing apparatus provided with the image capturing lens.

An image capturing lens of the present invention substantially consists of a first lens having a negative refractive power, a second lens having a positive refractive power, a third lens having a negative refractive power, a fourth lens having a positive refractive power, and a fifth lens having a negative refractive power, arranged in this order from the object side, wherein: the image side surface of the fifth lens has an aspherical shape with one or more inflection points and a concave shape toward the image side in a paraxial region; and the image capturing lens satisfies the following conditional expressions (1a): $-1.5 < f/R2 < 1.6$, (2a): $-1.6 < f/R4 < 0.05$, and (3a): $0.95 \leq f4/f \leq 4.3$ simultaneously, where: f is a focal length of the entire lens system; R2 is a radius of curvature of the image side surface of the first lens; R4 is a radius of curvature of the image side surface of the second lens; and f4 is a focal length of the fourth lens.

The image capturing lens described above may be formed to satisfy a conditional expression (4a): $0.55 \leq f12/f \leq 5.0$, where f12 is a combined focal length of the first and second lenses.

The image capturing lens described above may be formed to satisfy a conditional expression (5a): $1.0 \leq TL/f \leq 2.2$, where TL is an overall optical length (an overall optical length when a distance from the image side surface of the fifth lens to the image plane is represented by an air equivalent length).

The image capturing lens described above may be formed to satisfy a conditional expression (6a): $0.1 \leq Bf/f \leq 0.5$, where Bf is a back focus (a back focus when a distance from the image side surface of the fifth lens to the image plane is represented by an air equivalent length).

The image side surface of the fourth lens may be a convex or planar surface in a paraxial region.

The image capturing lens described above may be formed to satisfy a conditional expression (7a): $-12 < (R1+R2)/(R1-R2) < -0.21$, where: R1 is a radius of curvature of the object side surface of the first lens (first lens surface); and R2 is a radius of curvature of the image side surface of the first lens (second lens surface).

The image capturing lens described above may be formed to satisfy a conditional expression (8a): $18 < v1 < 50$, where v1 is an Abbe number of the first lens.

The image capturing lens described above may be formed to satisfy a conditional expression (9a): $0.25 < (Dg2+Dg3)/f < 0.7$, where: Dg2 is an axial thickness of the second lens (a distance between the object side surface and image side surface of the second lens on the optical axis; actual length); and Dg3 is an axial thickness of the third lens (a distance between the object side surface and image side surface of the third lens on the optical axis; actual length).

The image capturing lens described above may be formed to satisfy a conditional expression (10a): 50<v4<65, where v4 is an Abbe number of the fourth lens.

The image capturing lens described above may be formed to satisfy a conditional expression (11a): 50<v5<65, where v5 is an Abbe number of the fifth lens.

The image capturing lens described above may be formed to satisfy a conditional expression (12a): −4.0<Σ(fj/vj)/f<4.0, where the expression Σ(fj/vj)/f represents the expression: [(f1/v1)+(f2/v2)+(f3/v3)+(f4/v4)+(f5/v5)]/f.

The image capturing lens described above may be formed to satisfy a conditional expression (1b): −1.0<f/R2<1.6.

The image capturing lens described above may be formed to satisfy a conditional expression (2b): −1.4<f/R4<0.05.

The image capturing lens described above may be formed to satisfy a conditional expression (3b): 0.95≤f4/f≤2.1.

The image capturing lens described above may be formed to satisfy a conditional expression (4b): 0.60≤f12/f≤1.30

The image capturing lens described above may be formed to satisfy a conditional expression (4c): 0.65≤f12/f≤1.30.

The image capturing lens described above may be formed to satisfy a conditional expression (9b): 0.45<(Dg2+Dg3)/f<0.6.

The image capturing lens described above may be formed to satisfy a conditional expression (12b): −2.0<Σ(fj/vj)/f<0.5.

An image capturing apparatus of the present invention includes the image capturing lens described above.

According to the image capturing lens of the present invention, a first lens having a negative refractive power, a second lens having a positive refractive power, a third lens having a negative refractive power, a fourth lens having a positive refractive power, and a fifth lens having a negative refractive power are arranged in this order from the object side, in which the image side surface of the fifth lens is formed to have an aspherical shape with one or more inflection points and a concave shape toward the image side in a paraxial region, and the image capturing lens is configured to satisfy conditional expressions (1a): −1.5<f/R2<1.6, (2a): −1.6<f/R4<0.05, and (3a): 0.95≤f4/f≤4.3 simultaneously. This makes the image capturing lens bright and high resolution to a peripheral angle of view with reduced overall length.

That is, the conditional expression (1a): −1.5<f/R2<1.6 defines a desirable range of the ratio of the focal length of the entire lens system to the radius of curvature of the image side surface of the first lens. If the image capturing lens is configured to exceed the upper limit of the conditional expression (1a), a problem arises that field curvature is likely to occur and the overall optical length becomes long if trying to inhibit the occurrence of the field curvature. On the other hand, if the image capturing lens is configured to fall below the lower limit of the conditional expression (1a), a problem arises that it is difficult to inhibit the occurrence of distortion and astigmatism because the symmetry of the optical system can not be maintained.

If the image capturing lens is configured to satisfy the conditional expression (1b): −1.0<f/R2<1.6 that further limits the range of the conditional expression (1a), the occurrence of the distortion and astigmatism may be inhibited more reliably.

The conditional expression (2a): −1.6<f/R4<0.05 defines a preferable range of the ratio of the focal length of the entire lens system to the radius of curvature of the image side surface of the second lens (fourth lens surface). If the image capturing lens is configured to exceed the upper limit of the conditional expression (2a), a problem arises that field curvature is likely to occur and the overall optical length becomes long if trying to inhibit the occurrence of the field curvature. On the other hand, if the image capturing lens is configured to fall below the lower limit of the conditional expression (2a), a problem arises that it is difficult to inhibit the occurrence of distortion and astigmatism because the symmetry of the optical system can not be maintained.

If the image capturing lens is configured to satisfy the conditional expression (2b): −1.4<f/R4<0.05 that further limits the range of the conditional expression (2a), the occurrence of the distortion and astigmatism may be inhibited more reliably.

The conditional expression (3a): 0.95≤f4/f≤4.3 relates to the ratio of the focal length of the fourth lens to the focal length of the entire lens system and defines a desirable range for obtaining an appropriate back focus while ensuring telecentricity.

If the image capturing lens is configured to fall below the lower limit of the conditional expression (3a), a problem arises that the back focus becomes too long.

On the other hand, if the image capturing lens is configured to exceed the upper limit of the conditional expression (3a), a problem arises that the exit angle of the most peripheral light beam passing through the aperture to the image side at the time of exiting from the image side surface of the fourth lens becomes large, causing difficulty in ensuring telecentricity.

If the image capturing lens is configured to satisfy the conditional expression (3b): 0.95≤f4/f≤2.1, the problems that occur when the image capturing lens exceeds the upper limit and falls below the lower limit described above may be improved more reliably.

BRIEF DESCRIPTION OF DRAWINGS

FIG. 3 is a cross-sectional view of an image capturing lens of Example 2.

FIG. 4 is a cross-sectional view of an image capturing lens of Example 3.

FIG. 5 is a cross-sectional view of an image capturing lens of Example 4.

FIG. 6 is a cross-sectional view of an image capturing lens of Example 5.

FIG. 9 is a cross-sectional view of an image capturing lens of Example 8.

FIG. 10 is a cross-sectional view of an image capturing lens of Example 9.

FIG. 11 is a cross-sectional view of an image capturing lens of Example 10.

FIG. 12 is a cross-sectional view of an image capturing lens of Example 11.

FIG. 13 is a cross-sectional view of an image capturing lens of Example 12.

FIG. 14 shows aberration diagrams of the image capturing lens of Example 1.

FIG. 15 shows aberration diagrams of the image capturing lens of Example 2.

FIG. 16 shows aberration diagrams of the image capturing lens of Example 3.

FIG. 17 shows aberration diagrams of the image capturing lens of Example 4.

FIG. 18 shows aberration diagrams of the image capturing lens of Example 5.

FIG. 19 shows aberration diagrams of the image capturing lens of Example 6.

FIG. 20 shows aberration diagrams of the image capturing lens of Example 7.

FIG. 21 shows aberration diagrams of the image capturing lens of Example 8.

FIG. 22 shows aberration diagrams of the image capturing lens of Example 9.

FIG. 23 shows aberration diagrams of the image capturing lens of Example 10.

FIG. 24 shows aberration diagrams of the image capturing lens of Example 11.

FIG. 25 shows aberration diagrams of the image capturing lens of Example 12.

BEST MODE FOR CARRYING OUT THE INVENTION

Hereinafter, an embodiment of the present invention will be described with reference to the accompanying drawings.

Figure 1:
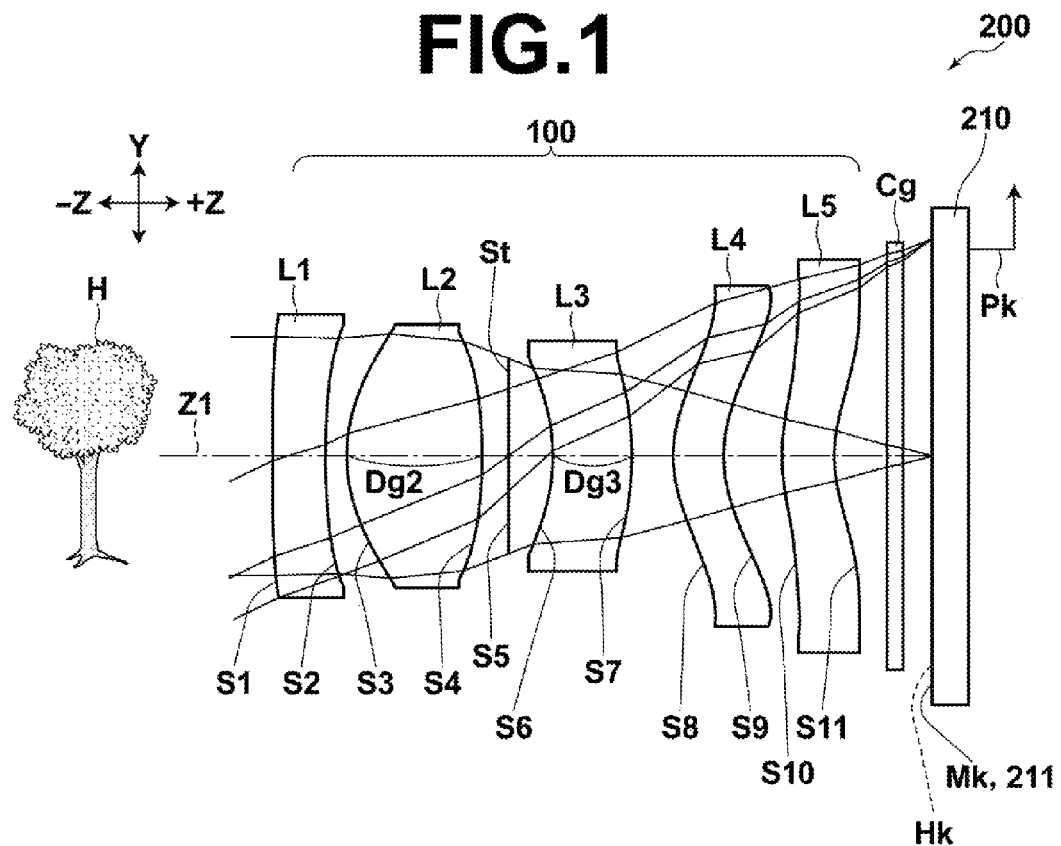
FIG. 1 is a cross-sectional view of an image capturing apparatus provided with an image capturing lens according to an embodiment of the present invention, illustrating a schematic configuration thereof.
Figure 2:
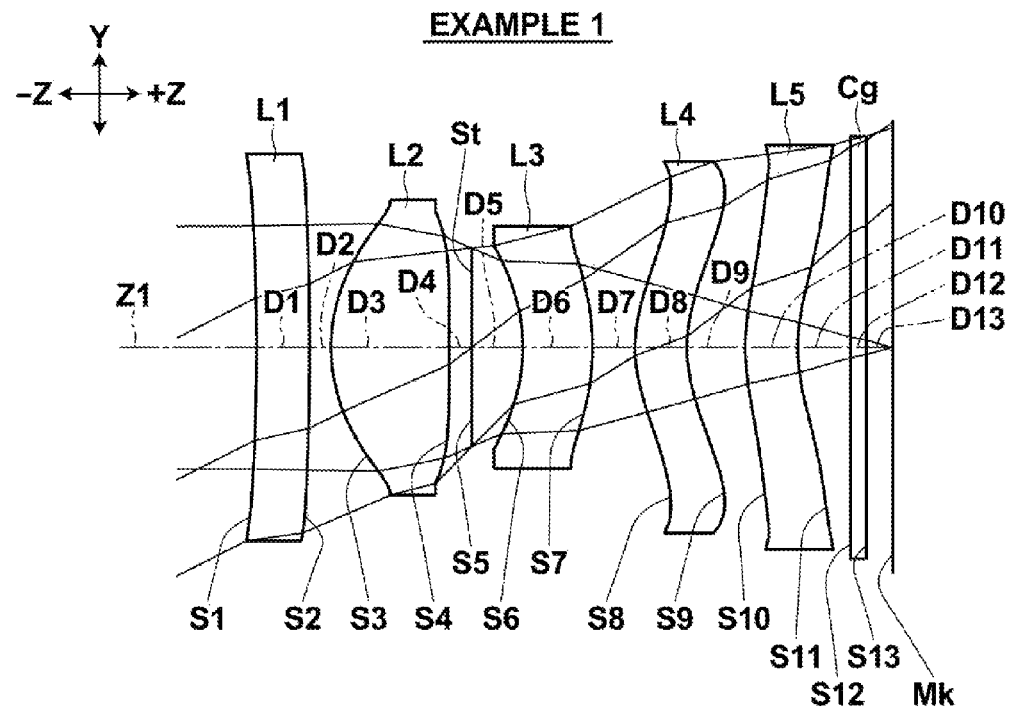
FIG. 2 is a cross-sectional view of an image capturing lens of Example 1.
Figure 7:
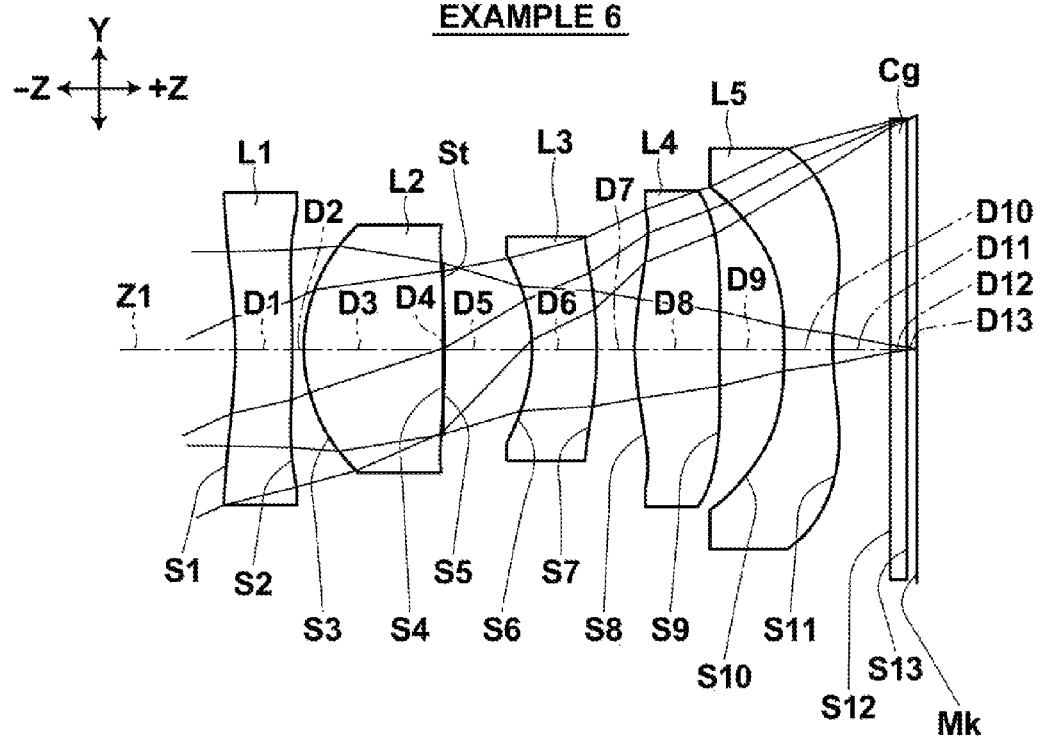
FIG. 7 is a cross-sectional view of an image capturing lens of Example 6.
Figure 8:
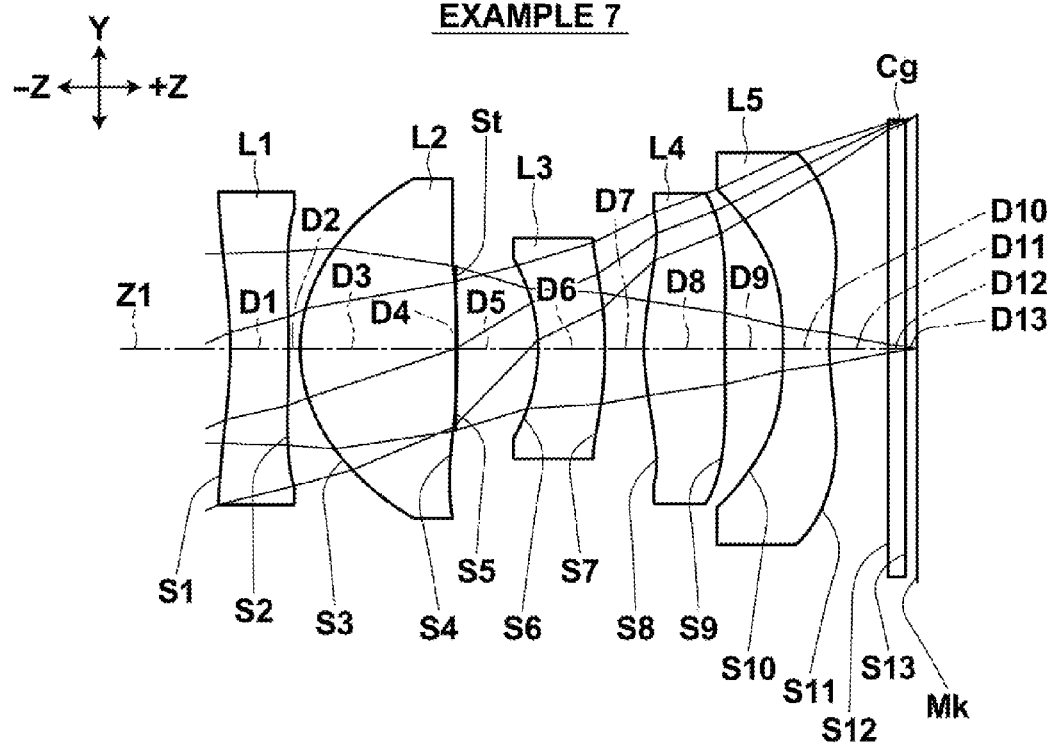
FIG. 8 is a cross-sectional view of an image capturing lens of Example 7.

FIG. 1 illustrates a schematic configuration of an image capturing apparatus 200 provided with an image capturing lens 100 according to an embodiment of the present invention.

The image capturing lens 100 illustrated in FIG. 1 is suitably applied to various types of image capturing devices that use an image sensor, such as CCD, CMOS, or the like. It is particularly useful for relatively small portable terminal devices, such as digital still cameras, camera-equipped cell phones, PDAs, and the like.

The image capturing apparatus 200 illustrated in FIG. 1 includes the image capturing lens 100 described above and an image sensor 210, such as CCD, CMOS, or the like, for outputting image capturing signal Pk according to an optical image Hk representing a subject H formed by the image capturing lens 100. The image capturing surface 211 of the image sensor 210 is disposed on the image forming surface Mk of the image capturing lens 100.

Various types of optical members Cg may be disposed between the fifth lens L5 which is the most image side lens constituting the image capturing lens 100 and image sensor 210 according to the structure of the image capturing apparatus 200 to which the image capturing lens 100 is installed. For example, an optical member, such as a cover glass for protecting the image capturing surface or an infrared cut filter, ND filter may be disposed as the optical member Cg. The optical member Cg may be a plane parallel plate.

The image capturing lens 100 is composed of five lenses and used for image formation.

The image capturing lens 100 is configured by arranging a first lens L1 having a negative refractive power, a second lens L2 having a positive refractive power, a third lens L3 having a negative refractive power, a fourth lens L4 having a positive refractive power, and a fifth lens L5 having a negative refractive power in this order from the object side (arrow −Z side in FIG. 1) along the optical axis Z1.

The image side surface S11 of the fifth lens L5 has an aspherical shape with one or more inflection points and a concave shape toward the image side in a paraxial region.

Further, the image capturing lens 100 satisfies conditional expressions (1a): −1.5<f/R2<1.6, (2a): −1.6<f/R4<0.05, and (3a): 0.95≤f4/f≤4.3 simultaneously, where: f is a focal length of the entire lens system; R2 is a radius of curvature of the image side surface of the first lens; R4 is a radius of curvature of the image side surface of the second lens; and f4 is a focal length of the fourth lens.

The radii of curvature are set with a positive or negative value, in which if the surface is convex on the object side, it is deemed positive, while if the surface is convex on the image side, it is deemed negative. In the case where a lens surface is an aspherical surface, a value of the radius of curvature of the aspherical surface in the paraxial region is used as the radius of curvature.

Further, focal lengths are set with a positive or negative value, in which, for an optical element (lens or the like), if the focal point is formed on the image side of the optical element, it is deemed positive, while if the focal point is formed on the object side of the optical element, it is deemed negative.

The terms "object side surface" and "image side surface" as used herein refer to lens surfaces on the object side and image side respectively.

Examples 1 to 12 to be described later are examples of the image capturing lens according to the embodiment of the present invention described above.

The image side surface S9 of the fourth lens L4 may be formed to have a convex or planar surface in a paraxial region.

The image side surface S11 of the fifth lens L5 may be formed to have only one inflection point.

The image capturing lens may include an aperture stop St between the second lens and third lens. If the image capturing lens is configured to include the aperture stop St between the second and third lenses, field curvature may be corrected more satisfactorily as the Petzval sum is reduced. Further, the image capturing lens may be made bright (to have a small F-number) while spherical aberration, longitudinal chromatic aberration, and coma aberration are inhibited more reliably in comparison with the case in which an aperture stop is disposed on the object side of the second lens.

The image capturing lens described above may include an aperture stop St on the object side of the second lens. If the image capturing lens is configured to include the aperture stop St on the object side of the second lens, the incident angle of the light beam on the image forming surface is reduced in comparison with the case in which an aperture stop is disposed on the image side of the second lens, rapid changes on the image forming surface in the amount of incident light and distortion according to the image height may be inhibited. Along with this, the overall optical length may be reduced more reliably.

The image capturing lens 100 described above may be configured to satisfy, as appropriate, each conditional expression given below.

Conditional Expression (4a): $0.55 \leq f12/f \leq 5.0$
Conditional Expression (4b): $0.60 \leq f12/f \leq 1.30$
Conditional Expression (4c): $0.65 \leq f12/f \leq 1.30$
Conditional Expression (5a): $1.0 \leq TL/f \leq 2.2$
Conditional Expression (6a): $0.1 \leq Bf/f \leq 0.5$
Conditional Expression (7a): $-12 < (R1+R2)/(R1-R2) < -0.21$
Conditional Expression (8a): $18 < v1 < 50$
Conditional Expression (9a): $0.25 < (Dg2+Dg3)/f < 0.7$
Conditional Expression (9b): $0.45 < (Dg2+Dg3)/f < 0.6$
Conditional Expression (10a): $50 < v4 < 65$
Conditional Expression (11a): $50 < v5 < 65$
Conditional Expression (12a): $-4.0 < \Sigma(fj/vj)/f < 4.0$
Conditional Expression (12b): $-2.0 < \Sigma(fj/vj)/f < 0.5$ <Meaning of Each Parameter>
f: Focal Length of Entire Lens System
f1: Focal Length of First Lens
f2: Focal Length of Second Lens
f3: Focal Length of Third Lens
f4: Focal Length of Fourth Lens
f5: Focal Length of Fifth Lens
fj: Focal length of $j^{th}$ Lens (where, j=1 to 5)
f12: Combined Focal Length of First and Second Lenses
Bf: Back Focus (Air Equivalent Distance)
TL: Overall Optical Length (plane parallel plate on the image side is represented by an air equivalent length)
v1: Abbe Number of First Lens
v2: Abbe Number of Second Lens
v3: Abbe Number of Third Lens
v4: Abbe Number of Fourth Lens
v5: Abbe Number of Fifth Lens
vj: Abbe Number of Optical Member Constituting $j^{th}$ Lens (where, j=1 to 5)
Dg2: Axial thickness of Second Lens (Distance between Object Side Surface and Image Side Surface of Second Lens on Optical Axis; Actual Length)
Dg3: Axial thickness of Third Lens (Distance between Object Side Surface and Image Side Surface of Third Lens on Optical Axis; Actual Length)
R1: Radius of Curvature of Object Side Surface of First Lens (First Lens Surface)
R2: Radius of Curvature of Image Side Surface of First Lens (Second Lens Surface)
R4: Radius of Curvature of Image Side Surface of Second Lens (Fourth Lens Surface)
Note that the expression $\Sigma(fj/vj)/f$ represents the expression: $[(f1/v1)+(f2/v2)+(f3/v3)+(f4/v4)+(f5/v5)]/f$.

<Description of Advantageous Effects of Each Conditional Expression>

The conditional expression (4a): $0.55 \leq f12/f \leq 5.0$ relates to the ratio of the combined focal length of the first and second lens to the focal length of the entire lens system and defines a desirable range for securing an appropriate back focus while inhibiting distortion.

If the image capturing lens (4a) is configured to fall below the lower limit of the conditional expression (4a), a problem arises that the combined focal length of the first and second lenses becomes too short to secure back focus and the lens becomes inadequate for practical use due to a large distortion.

On the other hand, if the image capturing lens is configured to exceed the upper limit of the conditional expression (4a), a problem arises that the back focus becomes long, thereby making it difficult to reduce the overall optical length.

If the image capturing lens is configured to satisfy the conditional expression (4b): $0.60 \leq f12/f \leq 1.30$, the problems that occur at the lower and upper limits described above may be improved more reliably.

If the image capturing lens is configured to satisfy the conditional expression (4c): $0.65 \leq f12/f \leq 1.30$, the problems that occur at the lower and upper limits described above may be improved still more reliably.

The conditional expression (5a): $1.0 \leq TL/f \leq 2.2$ defines the range of ratio of the overall optical length to the focal length of the entire lens system.

If the image capturing lens is configured to fall below the lower limit of the conditional expression (5a), the power of each lens needs to be increased and various types of aberrations are aggravated, thereby causing a problem that the optical performance is degraded. Further, an axial light beam and an off-axis light beam come too close to each other on the object side surface of the first lens, so that a problem arises that it is difficult to balance the aberrations for both the axial and off-axial light beams simultaneously.

On the other hand, if the image capturing lens is configured to exceed the upper limit of the conditional expression (5a), the downsizing of the optical system becomes difficult, so that it is difficult to apply the image capturing lens to an image capturing apparatus required to be compact.

The conditional expression (6a): $0.1 \leq Bf/f \leq 0.5$ relates to the ratio of back focus to the entire lens system and defines a desirable range for securing an appropriated back focus that allows various optical members to be disposed between the image capturing lens and image capturing surface.

If the image capturing lens is configured to fall below the lower limit of the conditional expression (6a), the distance between the image capturing lens and image capturing surface becomes too small, causing it difficult to secure an area for disposing a member such as a cover glass and the like.

If the image capturing lens is configured to exceed the upper limit of the conditional expression (6a), the power of the positive lens among the first to third lenses needs to be increased, resulting in increased distortion and difficulty in securing telecentricity, which is a problem of disadvantage for overall length reduction.

The conditional expression (7a): $-12<(R1+R2)/(R1-R2)<-0.21$ relates to the relationship between the radius of curvature of the object side surface and radius of curvature of the image side surface of the first lens and defines a desirable range for balancing between mainly coma aberration and the other aberration to inhibit the occurrence of both aberrations.

If the image capturing lens is configured to fall below the lower limit of the conditional expression (7a), a problem arises that coma aberration is aggravated, leading to aggravation of lateral chromatic aberration.

On the other hand, if the image capturing lens is configured to exceed the upper limit of the conditional expression (7a), a problem arises that coma aberration is aggravated, causing also aggravation of astigmatism.

The conditional expression (8a): $18<v1<50$ relates to the Abbe number of optical member used for the first lens and defines a desirable range for appropriately correcting longitudinal chromatic aberration.

If the image capturing lens is configured to fall below the lower limit of the conditional expression (8a), a problem arises that the correction of longitudinal chromatic aberration becomes insufficient.

On the other hand, if the image capturing lens is configured to exceed the upper limit of the conditional expression (8a), a problem arises that the correction of longitudinal chromatic aberration becomes excessive.

The conditional expression (9a): $0.25<(Dg2+Dg3)/f<0.7$ relates to the total thickness of the axial thicknesses of the second and third lenses and defines a desirable range for making the image capturing lens bright (to have a small F-number). That is, in order to make the image capturing lens bright, it is necessary to set the axial thicknesses of the second and third lenses to appropriate values.

If the image capturing lens is configured to satisfy the conditional expression (9a), the lens may be made bright more reliably.

If the image capturing lens is configured to satisfy the conditional expression (9b): $0.45<(Dg2+Dg3)/f<0.6$, the lens may be made bright still more reliably.

The conditional expression (10a): $50<v4<65$ relates to the Abbe number of optical member used for the fourth lens and defines a desirable range for the improvement that focuses more on lateral chromatic aberration than on longitudinal chromatic aberration. If the image capturing lens is configured to satisfy the conditional expression (10a), lateral chromatic aberration is improved more reliably while degradation of longitudinal chromatic aberration is inhibited.

Here, if the image capturing lens is configured to fall below the lower limit of the conditional expression (10a), a problem arises that the correction of longitudinal chromatic aberration becomes difficult. On the other hand, if the image capturing lens is configured to exceed the upper limit of the conditional expression (10a), a problem arises that the correction of longitudinal chromatic aberration becomes difficult.

The conditional expression (11a): $50<v5<65$ defines a desirable range of Abbe number of optical member used for the fifth lens.

The conditional expression (11a) defines the range of Abbe number of optical member used for the fifth lens and defines a desirable range for mainly correcting lateral chromatic aberration, though the amount of correction is small in comparison with that of the lateral chromatic aberration in the fourth lens. If either of the upper and lower limits of the conditional expression (11a) is exceeded, improvement of lateral chromatic aberration becomes difficult.

The conditional expression (12a): $-4.0<\Sigma(fj/vj)/f<4.0$ defines a desirable range of the relationship of the focal length of each of the first to fifth lenses and the Abbe number of optical member constituting each lens to the focal length of the entire lens system.

If the upper limit of the conditional expression (12a) is exceeded, correction of longitudinal chromatic aberration becomes insufficient and the longitudinal chromatic aberration becomes too large. On the other hand, if the lower limit of the conditional expression (12a) is exceeded, correction of longitudinal chromatic aberration becomes excessive and the longitudinal chromatic aberration becomes too large again.

If the image capturing lens is configured to satisfy the conditional expression (12b): $-2.0<\Sigma(fj/vj)/f<0.5$, the image capturing lens may be made bright more reliably.

Specific Examples

Specific examples of the image capturing lens according to the present embodiment will be described collectively.

FIGS. 2 to 13 illustrate cross-sections of image capturing lenses corresponding to Examples 1 to 12 respectively.

In FIGS. 2 to 13, the symbol Lj represents $j^{th}$ lens in which a number j is given to each lens in a serially increasing manner toward the image side (image forming side) with the most object side lens being taken as the first lens. The symbol Si represents $i^{th}$ surface (which includes aperture stop and the like) in which a number is given to each surface in a serially increasing manner toward the image side (image forming side) with the object side surface of the most object side lens being taken as the first surface. The symbol Di represents the distance between $i^{th}$ surface and $(i+1)^{th}$ surface on the optical axis.

Components of image capturing lenses of Examples 1 to 12 shown in FIGS. 2 to 13 identical to those of the image capturing lens 100 already described are given the same symbols.

Tables 1 to 12 show specific lens data of image capturing lenses of Examples 1 to 12. The upper side (indicated by the symbol (a)) of each of tables 1 to 12 shows specific lens data and the lower side (indicated by the symbol (b)) shows aspherical surface coefficients.

The aspherical surface expression used here is given below.

$$Z = C \cdot h^2 / \{1 + (1 - K \cdot C^2 \cdot h^2)^{1/2}\} + \Sigma Ai \cdot hi$$

where:
Z: depth of an aspherical surface (mm)
H: distance (height) from the optical axis to the lens surface (mm)
K: eccentricity
C: paraxial curvature=1/R (R: paraxial radius of curvature)
Ai: $i^{th}$ order (i is an integer greater than or equal to 3) aspherical surface coefficient The * mark attached to a surface number indicates that the surface is an aspherical surface. The value of the focal length f of the entire lens system, value of the F-number (FNo.) and value of the total angle of view $2\omega$ (°) are shown in the lower margin of the basic lens data indicated by the symbol (a).

The column of surface number Si of basic lens data in each table shows $i^{th}$ surface number in which a number i is given to each surface in a serially increasing manner toward the image side with the surface on the object side of the most object side lens element being taken as the first surface. Note that the aperture stop St and cover glass Cg are included in the lens element. The column of radius of curvature Ri shows the value of the radius of curvature of $i^{th}$ surface (lens element surface) from the object side (mm). The positive or negative for a radius of curvature is decided such that if the surface is convex on the object side, it is positive while if the surface is convex on the image side, it is negative. The column of surface distance Di shows the distance between $i^{th}$ surface Si from the object side and $(i+1)^{th}$ surface Si+1 on the optical axis (mm). The column of Ndj shows the value of refractive index of j' optical element from the object side with respect to the d-line (587.6 nm). The column of vdj shows the value of Abbe number of $j^{th}$ optical element from the object side with reference to the d-line.

The radius of curvature of an aspherical surface shown in the basic lens data is the value of radius of curvature in the paraxial region of the aspherical surface.

Table 13 summarizes the value calculated by the formula in each conditional expression described above, and the value representing a physical property value, lens performance, and the like described in the conditional expression for image capturing lenses of Examples 1 to 12. In Table 13, the numerical values with the mark ♦ attached thereto indicate that they are values outside of the ranges satisfying the respective conditional expressions.

The diagrams indicated by the symbols α, β, and γ in FIGS. 14 to 25 illustrate spherical aberration, field curvature (astigmatism), and distortion aberration (distortion) of image capturing lenses of Examples 1 to 12 respectively. Each aberration diagram shows aberration with the e-line (wavelength 546.07 nm) as the reference wavelength. The spherical aberration diagram and astigmatism diagram also illustrate aberrations with respect to the F-line (wavelength 486.13 nm) and C-line (wavelength 656.27 nm). In the diagram indicating field curvature (astigmatism), the solid line illustrates aberration in the sagittal direction (S) while the broken line illustrates aberration in the tangential direction (T). FNo. represents F-number and Y represents image height.

As is known from the data of each numerical value and each aberration diagram, each of the image capturing lenses of Examples 1 to 12 in the embodiment of the present invention is bright and high resolution to a peripheral angle of view with reduced overall optical length.

Figure 26:
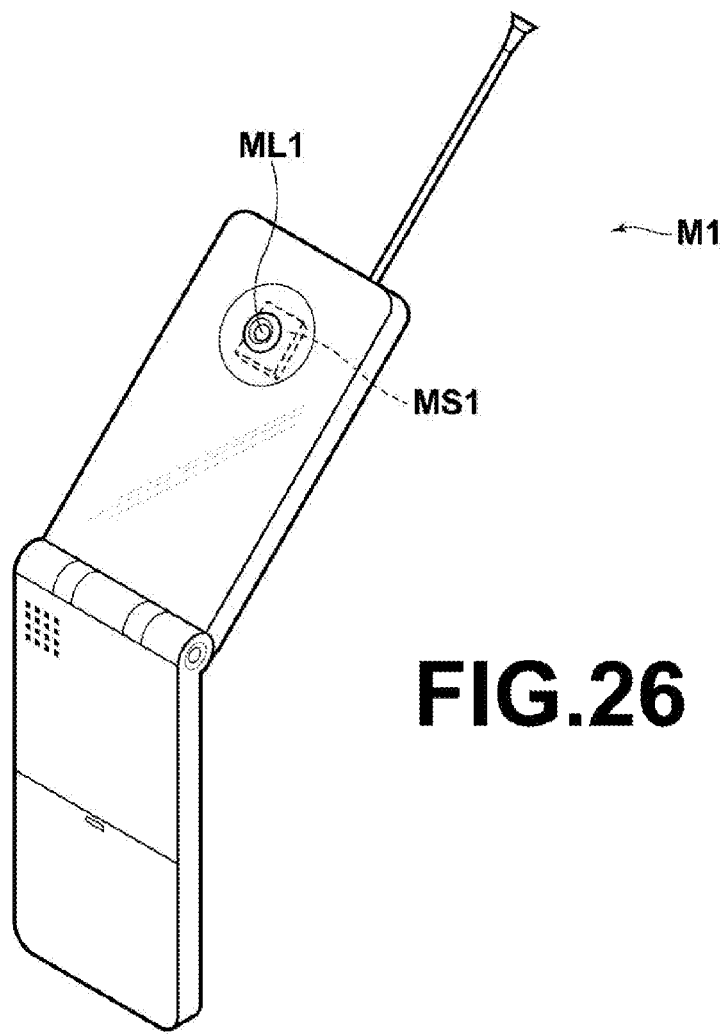
FIG. 26 illustrates a cell phone provided with the image capturing lens of the present invention.

FIG. 26 illustrates an overview of a camera-equipped cell phone M1 which is an example of the image capturing apparatus of the present invention. The camera-equipped cell phone M1 includes an image capturing lens ML1 according to an embodiment of the present invention and an image sensor MS1, such as a CCD or the like, for capturing an optical image formed by the image capturing lens ML1 and outputting an image capturing signal according to the optical image. The image sensor MS1 is disposed on the image forming surface (image capturing surface) of the image capturing lens ML1.

Figure 27:
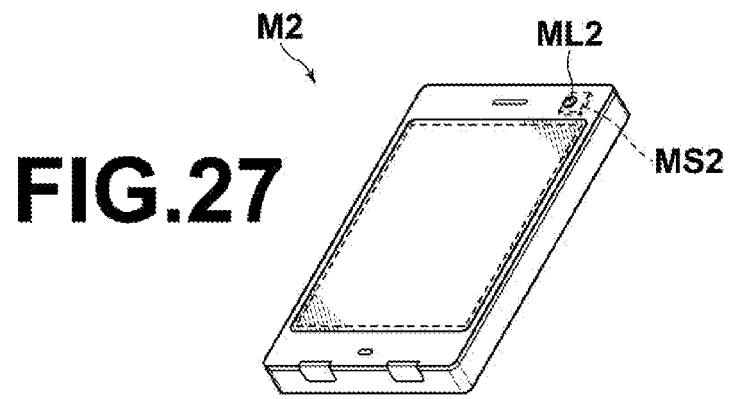
FIG. 27 illustrates a smartphone provided with the image capturing lens of the present invention.

FIG. 27 illustrates an overview of a smartphone M2 which is an example of the image capturing apparatus of the present invention. The smartphone M2 includes an image capturing lens ML2 according to an embodiment of the present invention and an image sensor MS2, such as a CCD or the like, for capturing an optical image formed by the image capturing lens ML2 and outputting an image capturing signal according to the optical image. The image sensor MS2 is disposed on the image forming surface (image capturing surface) of the image capturing lens ML2.

It should be understood that the present invention is not limited to the embodiment described above and each example, and various changes and modifications may be made without departing from the spirit of the invention. For example, values of radius of curvature of each lens, surface distance, refractive index, and the like are not limited to those shown in each table and may take other values.

TABLE 1

(a)
EXAMPLE 1 • BASIC LENS DATA

| Si (S-No.) | Ri (R-CUR.) | Di (S-DIST.) | Ndj (R-INDEX) | vdj (ABBE No.) |
|---|---|---|---|---|
| *1 | −20.1962 | 0.5000 | 1.9000 | 23.9 |
| *2 | −25.9839 | 0.2000 | | |
| *3 | 1.7653 | 1.1170 | 1.4714 | 76.6 |
| *4 | 245.3966 | 0.2130 | | |
| 5 | ∞(A-stop) | 0.4840 | | |
| *6 | −1.9706 | 0.6550 | 1.6318 | 23.2 |
| *7 | −3.1984 | 0.4030 | | |
| *8 | 1.4948 | 0.4910 | 1.5311 | 55.4 |
| *9 | 1.6045 | 0.5500 | | |
| *10 | 2.2618 | 0.4950 | 1.5311 | 55.4 |
| *11 | 1.7908 | 0.5000 | | |
| 12 | ∞ | 0.1500 | 1.5168 | 64.2 |
| 13 | ∞ | 0.2340 | | |

(b)
EXAMPLE 1 • ASPHERICAL SURFACE DATA

A/S COEFF. S1

| KA | 1.821082E−01 |
|---|---|
| RA4 | 3.314457E−03 |
| RA6 | −9.047800E−04 |
| RA8 | 1.107746E−04 |
| RA10 | −3.631103E−05 |

A/S COEFF. S2

| KA | −8.433420E−03 |
|---|---|
| RA4 | 3.015546E−03 |
| RA6 | −5.559998E−04 |
| RA8 | 7.066883E−05 |
| RA10 | −4.457105E−05 |

A/S COEFF. S3

| KA | 8.048995E−01 |
|---|---|
| RA3 | −9.325674E−03 |
| RA4 | 1.178508E−02 |
| RA5 | −1.226436E−02 |
| RA6 | 2.876158E−04 |
| RA7 | 2.804896E−03 |
| RA8 | −1.167997E−02 |
| RA9 | 6.514900E−04 |
| RA10 | 1.567743E−02 |
| RA11 | −8.306755E−04 |
| RA12 | −1.099378E−02 |
| RA13 | −6.678945E−05 |
| RA14 | 3.663655E−03 |
| RA15 | 1.973703E−04 |
| RA16 | −7.234609E−04 |

A/S COEFF. S4

| KA | −1.851941E+01 |
|---|---|
| RA3 | −1.373735E−02 |
| RA4 | 6.281687E−03 |
| RA5 | −1.939076E−02 |
| RA6 | −6.412338E−03 |
| RA7 | 1.029328E−03 |
| RA8 | 1.997997E−03 |
| RA9 | 4.541919E−04 |
| RA10 | −1.199506E−03 |
| RA11 | 8.648156E−04 |
| RA12 | −1.286812E−04 |
| RA13 | −1.313256E−03 |
| RA14 | −1.276691E−03 |
| RA15 | 1.366674E−03 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| KA | 7.660176E−02 |
|---|---|
| RA4 | −5.062983E−02 |
| RA6 | 4.284160E−02 |
| RA8 | −1.508137E−02 |
| RA10 | 1.188782E−02 |
| RA12 | 3.288304E−03 |
| RA14 | 2.695346E−03 |
| RA16 | −6.851868E−03 |

A/S COEFF. S7

| KA | −8.183783E−02 |
|---|---|
| RA4 | −1.102399E−01 |
| RA6 | 1.502402E−01 |
| RA8 | −1.091055E−01 |
| RA10 | 7.011100E−02 |
| RA12 | −2.471289E−02 |
| RA14 | 7.049701E−03 |
| RA16 | −1.628896E−03 |

A/S COEFF. S8

| KA | 3.140061E−01 |
|---|---|
| RA4 | −1.563290E−01 |
| RA6 | 5.221782E−02 |
| RA8 | −1.725711E−02 |
| RA10 | 3.001579E−03 |
| RA12 | −9.451758E−06 |
| RA14 | −9.238682E−05 |
| RA16 | 8.801745E−06 |

A/S COEFF. S9

| KA | 1.103869E−02 |
|---|---|
| RA4 | −8.846079E−02 |
| RA6 | 1.033236E−02 |
| RA8 | 9.920572E−04 |
| RA10 | −3.905443E−04 |
| RA12 | −4.424448E−04 |
| RA14 | 1.715627E−04 |
| RA16 | −2.032264E−05 |

A/S COEFF. S10

| KA | −1.272081E+01 |
|---|---|
| RA4 | −3.554031E−02 |
| RA6 | 8.590415E−03 |
| RA8 | 6.183899E−04 |
| RA10 | −3.441543E−04 |

A/S COEFF. S11

| KA | −8.008005E+00 |
|---|---|
| RA4 | −2.285202E−02 |
| RA6 | −1.330516E−03 |

TABLE 1-continued

| | |
|---|---|
| RA8 | 1.934550E-03 |
| RA10 | -2.240361E-04 |

*ASPHERICAL SURFACE
R-CUR.: RADIUS OF CURVATURE
S-DIST.: SURFACE DISTANCE
A-stop: APERTURE STOP
$f = 4.172$ FNo. $= 1.71$ $2\omega = 56.3°$

TABLE 2

(a)
EXAMPLE 2 • BASIC LENS DATA

| Si (S-No.) | Ri (R-CUR.) | Di (S-DIST.) | Ndj (R-INDEX) | vdj (ABBE No.) |
|---|---|---|---|---|
| *1  | -20.3993 | 0.5000 | 1.9000 | 23.9 |
| *2  | -25.6679 | 0.2000 | | |
| *3  | 1.7662   | 1.1190 | 1.4714 | 76.6 |
| *4  | 207.9396 | 0.2070 | | |
|  5  | ∞(A-stop) | 0.4850 | | |
| *6  | -1.9685  | 0.6560 | 1.6318 | 23.2 |
| *7  | -3.2046  | 0.4060 | | |
| *8  | 1.4978   | 0.4870 | 1.5311 | 55.4 |
| *9  | 1.6030   | 0.5500 | | |
| *10 | 2.2477   | 0.4950 | 1.5311 | 55.4 |
| *11 | 1.7991   | 0.5000 | | |
|  12 | ∞        | 0.1500 | 1.5168 | 64.2 |
|  13 | ∞        | 0.2400 | | |

(b)
EXAMPLE 2 • ASPHERICAL SURFACE DATA

A/S COEFF. S1

| | |
|---|---|
| KA | -1.000119E+00 |
| RA4 | 3.349588E-03 |
| RA6 | -9.016069E-04 |
| RA8 | 1.115847E-04 |
| RA10 | -3.611838E-05 |

A/S COEFF. S2

| | |
|---|---|
| KA | 9.724992E-01 |
| RA4 | 2.985867E-03 |
| RA6 | -5.583539E-04 |
| RA8 | 6.971573E-05 |
| RA10 | -4.500446E-05 |

A/S COEFF. S3

| | |
|---|---|
| KA | 8.050454E-01 |
| RA3 | -9.245654E-03 |
| RA4 | 1.180609E-02 |
| RA5 | -1.226770E-02 |
| RA6 | 2.851530E-04 |
| RA7 | 2.804110E-03 |
| RA8 | -1.168005E-02 |
| RA9 | 6.517308E-04 |
| RA10 | 1.567788E-02 |
| RA11 | -8.300735E-04 |
| RA12 | -1.099310E-02 |
| RA13 | -6.611211E-05 |
| RA14 | 3.664273E-03 |
| RA15 | 1.978951E-04 |
| RA16 | -7.230438E-04 |

A/S COEFF. S4

| | |
|---|---|
| KA | -2.247220E+01 |
| RA3 | -1.368469E-02 |
| RA4 | 6.279852E-03 |
| RA5 | -1.940008E-02 |
| RA6 | -6.420045E-03 |
| RA7 | 1.023626E-03 |
| RA8 | 1.993796E-03 |
| RA9 | 4.511899E-04 |
| RA10 | -1.201437E-03 |
| RA11 | 8.638600E-04 |
| RA12 | -1.287550E-04 |
| RA13 | -1.312558E-03 |
| RA14 | -1.275343E-03 |
| RA15 | 1.368547E-03 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| | |
|---|---|
| KA | 7.609524E-02 |
| RA4 | -5.062274E-02 |
| RA6 | 4.290068E-02 |
| RA8 | -1.500587E-02 |
| RA10 | 1.195254E-02 |
| RA12 | 3.328796E-03 |
| RA14 | 2.711207E-03 |
| RA16 | -6.854147E-03 |

A/S COEFF. S7

| | |
|---|---|
| KA | -5.727654E-02 |
| RA4 | -1.101066E-01 |
| RA6 | 1.501998E-01 |
| RA8 | -1.091395E-01 |
| RA10 | 7.010048E-02 |
| RA12 | -2.471107E-02 |
| RA14 | 7.055736E-03 |
| RA16 | -1.622285E-03 |

A/S COEFF. S8

| | |
|---|---|
| KA | 3.104841E-01 |
| RA4 | -1.565560E-01 |
| RA6 | 5.215841E-02 |
| RA8 | -1.726363E-02 |
| RA10 | 3.002528E-03 |
| RA12 | -8.845754E-06 |
| RA14 | -9.223378E-05 |
| RA16 | 8.809320E-06 |

A/S COEFF. S9

| | |
|---|---|
| KA | 1.782861E-02 |
| RA4 | -8.825229E-02 |
| RA6 | 1.038832E-02 |
| RA8 | 9.994994E-04 |
| RA10 | -3.904618E-04 |
| RA12 | -4.425986E-04 |
| RA14 | 1.715282E-04 |
| RA16 | -2.032296E-05 |

A/S COEFF. S10

| | |
|---|---|
| KA | -1.262051E+01 |
| RA4 | -3.540275E-02 |
| RA6 | 8.579314E-03 |
| RA8 | 6.100984E-04 |
| RA10 | -3.463127E-04 |

A/S COEFF. S11

| | |
|---|---|
| KA | -8.142626E+00 |
| RA4 | -2.405794E-02 |
| RA6 | -1.449985E-03 |
| RA8 | 1.923860E-03 |
| RA10 | -2.248906E-04 |

*ASPHERICAL SURFACE
R-CUR.: RADIUS OF CURVATURE
S-DIST.: SURFACE DISTANCE
A-stop: APERTURE STOP
$f = 4.178$ FNo. $= 1.71$ $2\omega = 56.2°$

TABLE 3

(a) EXAMPLE 3 • BASIC LENS DATA

| Si (S-No.) | Ri (R-CUR.) | Di (S-DIST.) | Ndj (R-INDEX) | vdj (ABBE No.) |
|---|---|---|---|---|
| *1 | −12.2892 | 0.5000 | 1.5339 | 56.0 |
| *2 | −17.9346 | 0.1000 | | |
| *3 | 2.0103 | 1.3110 | 1.5311 | 55.3 |
| *4 | −42.2797 | 0.2500 | | |
| 5 | ∞(A-stop) | 0.2610 | | |
| *6 | −1.8005 | 0.7500 | 1.6317 | 23.3 |
| *7 | −4.1309 | 0.4210 | | |
| *8 | 1.5588 | 0.6180 | 1.5311 | 55.3 |
| *9 | 2.1414 | 0.5500 | | |
| *10 | 1.6303 | 0.5000 | 1.5311 | 55.3 |
| *11 | 1.4423 | 0.5000 | | |
| 12 | ∞ | 0.1500 | 1.5168 | 64.2 |
| 13 | ∞ | 0.3320 | | |

(b) EXAMPLE 3 • ASPHERICAL SURFACE DATA

| A/S COEFF. S1 | |
|---|---|
| KA | −1.569959E+00 |
| RA4 | 1.307924E−02 |
| RA6 | −2.240533E−03 |
| RA8 | 5.268908E−05 |
| RA10 | −3.171679E−05 |

| A/S COEFF. S2 | |
|---|---|
| KA | −1.195278E+00 |
| RA4 | 1.069621E−02 |
| RA6 | −6.353668E−04 |
| RA8 | −6.425006E−04 |
| RA10 | 6.384371E−05 |

| A/S COEFF. S3 | |
|---|---|
| KA | 7.859335E−01 |
| RA3 | −7.719080E−03 |
| RA4 | 7.459175E−03 |
| RA5 | −1.048332E−02 |
| RA6 | 9.932959E−04 |
| RA7 | 2.656090E−03 |
| RA8 | −8.729591E−03 |
| RA9 | 3.551581E−04 |
| RA10 | 1.078215E−02 |
| RA11 | −6.774913E−04 |
| RA12 | −7.150484E−03 |
| RA13 | −7.163043E−05 |
| RA14 | 2.171119E−03 |
| RA15 | 1.150380E−04 |
| RA16 | −3.953639E−04 |

| A/S COEFF. S4 | |
|---|---|
| KA | 2.281520E+01 |
| RA3 | −1.234242E−02 |
| RA4 | −1.405172E−02 |
| RA5 | −2.379714E−02 |
| RA6 | −5.468667E−03 |
| RA7 | 2.392662E−03 |
| RA8 | 2.835677E−03 |
| RA9 | 1.008447E−03 |
| RA10 | −6.671577E−04 |
| RA11 | 4.842607E−04 |
| RA12 | −2.941906E−04 |
| RA13 | −1.006242E−03 |
| RA14 | −8.761286E−04 |
| RA15 | 7.945185E−04 |
| RA16 | 0.000000E+00 |
| RA17 | 0.000000E+00 |
| RA18 | 0.000000E+00 |
| RA19 | 0.000000E+00 |
| RA20 | 0.000000E+00 |

| A/S COEFF. S6 | |
|---|---|
| KA | 7.000678E−01 |
| RA4 | −6.218916E−02 |
| RA6 | 4.884543E−02 |
| RA8 | −1.072817E−02 |
| RA10 | 1.341251E−02 |
| RA12 | 2.775216E−03 |
| RA14 | 9.189144E−04 |
| RA16 | −9.332501E−03 |

| A/S COEFF. S7 | |
|---|---|
| KA | 1.858604E+00 |
| RA4 | −1.216176E−01 |
| RA6 | 1.462762E−01 |
| RA8 | −1.087527E−01 |
| RA10 | 6.945107E−02 |
| RA12 | −2.546405E−02 |
| RA14 | 6.697598E−03 |
| RA16 | −1.552783E−03 |

| A/S COEFF. S8 | |
|---|---|
| KA | 5.475139E−01 |
| RA4 | −1.214662E−01 |
| RA6 | 5.167571E−02 |
| RA8 | −1.870017E−02 |
| RA10 | 2.861969E−03 |
| RA12 | 1.226838E−05 |
| RA14 | −8.582969E−05 |
| RA16 | 7.092426E−06 |

| A/S COEFF. S9 | |
|---|---|
| KA | 1.300153E−01 |
| RA4 | −4.230403E−02 |
| RA6 | 1.064061E−02 |
| RA8 | 5.324833E−04 |
| RA10 | −4.349059E−04 |
| RA12 | −4.344060E−04 |
| RA14 | 1.761149E−04 |
| RA16 | −1.947494E−05 |

| A/S COEFF. S10 | |
|---|---|
| KA | −3.063614E+00 |
| RA4 | −6.958217E−02 |
| RA6 | 1.035763E−02 |
| RA8 | 1.748304E−03 |
| RA10 | −3.775779E−04 |

| A/S COEFF. S11 | |
|---|---|
| KA | −3.416586E+00 |
| RA4 | −3.973362E−02 |
| RA6 | −1.128416E−03 |
| RA8 | 1.618204E−03 |
| RA10 | −1.443459E−04 |

*ASPHERICAL SURFACE
R-CUR.: RADIUS OF CURVATURE
S-DIST.: SURFACE DISTANCE
A-stop: APERTURE STOP
f = 4.077 FNo. = 1.83 2ω = 57.5°

TABLE 4

(a) EXAMPLE 4 • BASIC LENS DATA

| Si (S-No.) | Ri (R-CUR.) | Di (S-DIST.) | Ndj (R-INDEX) | vdj (ABBE No.) |
|---|---|---|---|---|
| *1 | −6.6545 | 0.5000 | 1.9000 | 20.0 |
| *2 | −8.3055 | 0.2000 | | |
| *3 | 1.4919 | 1.4290 | 1.4714 | 76.6 |
| *4 | 6050.1946 | 0.2610 | | |
| 5 | ∞(A-stop) | 0.3420 | | |
| *6 | −1.8508 | 0.4470 | 1.6317 | 23.3 |
| *7 | −3.2566 | 0.2370 | | |
| *8 | 3.2813 | 0.5450 | 1.5311 | 55.3 |
| *9 | 4.9839 | 0.5500 | | |
| *10 | −18.0921 | 0.4950 | 1.5311 | 55.3 |
| *11 | 3.3125 | 0.5000 | | |

TABLE 4-continued

| 12 | ∞ | 0.1500 | 1.5168 | 64.2 |
| 13 | ∞ | 0.0790 | | |

(b)
EXAMPLE 4 • ASPHERICAL SURFACE DATA

A/S COEFF. S1

| KA | −5.475464E−01 |
| RA4 | 1.512196E−02 |
| RA6 | −1.019059E−03 |
| RA8 | 2.553857E−04 |
| RA10 | −1.770342E−05 |

A/S COEFF. S2

| KA | −3.942005E−01 |
| RA4 | 1.401337E−02 |
| RA6 | 1.205417E−03 |
| RA8 | −2.961151E−04 |
| RA10 | 1.179138E−04 |

A/S COEFF. S3

| KA | 6.330842E−01 |
| RA3 | −3.989033E−03 |
| RA4 | 4.485759E−03 |
| RA5 | −2.359619E−03 |
| RA6 | 5.055768E−03 |
| RA7 | 3.211784E−03 |
| RA8 | −1.248462E−02 |
| RA9 | 2.446631E−04 |
| RA10 | 1.570171E−02 |
| RA11 | −5.662444E−04 |
| RA12 | −1.067985E−02 |
| RA13 | 1.846282E−04 |
| RA14 | 3.806310E−03 |
| RA15 | 2.869195E−04 |
| RA16 | −7.279749E−04 |

A/S COEFF. S4

| KA | 1.000009E+00 |
| RA3 | −1.036098E−02 |
| RA4 | 3.795828E−03 |
| RA5 | −1.654604E−02 |
| RA6 | 4.140530E−04 |
| RA7 | 5.637470E−03 |
| RA8 | 4.074057E−03 |
| RA9 | 4.048715E−04 |
| RA10 | −1.479371E−03 |
| RA11 | 5.253782E−04 |
| RA12 | −2.656237E−04 |
| RA13 | −1.287676E−03 |
| RA14 | −1.245971E−03 |
| RA15 | 1.247911E−03 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| KA | 2.321002E−02 |
| RA4 | −2.305119E−02 |
| RA6 | 6.084893E−02 |
| RA8 | −2.890564E−02 |
| RA10 | −3.908266E−03 |
| RA12 | 1.206688E−02 |
| RA14 | 2.678633E−02 |
| RA16 | −4.275287E−02 |

A/S COEFF. S7

| KA | −8.200900E−02 |
| RA4 | −6.996177E−02 |
| RA6 | 1.632452E−01 |
| RA8 | −1.030350E−01 |
| RA10 | 8.084621E−02 |
| RA12 | −2.733276E−02 |
| RA14 | −2.171783E−03 |
| RA16 | 6.320633E−03 |

TABLE 4-continued

A/S COEFF. S8

| KA | 6.409224E−01 |
| RA4 | −1.703892E−01 |
| RA6 | 7.547818E−02 |
| RA8 | −4.163347E−02 |
| RA10 | 3.527204E−03 |
| RA12 | 2.228679E−03 |
| RA14 | 5.739936E−04 |
| RA16 | 9.368504E−04 |

A/S COEFF. S9

| KA | 1.519289E−02 |
| RA4 | −5.822724E−02 |
| RA6 | −1.586336E−02 |
| RA8 | 1.135342E−02 |
| RA10 | −4.223089E−03 |
| RA12 | −1.861781E−03 |
| RA14 | 4.955916E−04 |
| RA16 | 1.053079E−04 |

A/S COEFF. S10

| KA | −2.050030E+01 |
| RA4 | −1.455600E−01 |
| RA6 | 5.142328E−02 |
| RA8 | −1.183847E−03 |
| RA10 | −4.945904E−03 |

A/S COEFF. S11

| KA | −2.810203E+01 |
| RA4 | −8.627565E−02 |
| RA6 | 1.435262E−02 |
| RA8 | −5.465677E−04 |
| RA10 | −3.291515E−04 |

*ASPHERICAL SURFACE
R-CUR.: RADIUS OF CURVATURE
S-DIST.: SURFACE DISTANCE
A-stop: APERTURE STOP
f = 4.475 FNo. = 1.84 2ω = 52.9°

TABLE 5

(a)
EXAMPLE 5 • BASIC LENS DATA

| Si (S-No.) | Ri (R-CUR.) | Di (S-DIST.) | Ndj (R-INDEX) | νdj (ABBE No.) |
|---|---|---|---|---|
| *1 | −5.8902 | 0.5000 | 1.6317 | 23.3 |
| *2 | −12.6617 | 0.2000 | | |
| *3 | 1.7281 | 1.3990 | 1.5311 | 55.3 |
| *4 | −11.7659 | 0.3500 | | |
| 5 | ∞(A-stop) | 0.2530 | | |
| *6 | −2.0367 | 0.5200 | 1.6317 | 23.3 |
| *7 | −5.4404 | 0.3450 | | |
| *8 | 2.6439 | 0.6620 | 1.5311 | 55.3 |
| *9 | 19.8537 | 0.6010 | | |
| *10 | −7.3110 | 0.4950 | 1.5311 | 55.3 |
| *11 | 3.1368 | 0.5000 | | |
| 12 | ∞ | 0.1500 | 1.5168 | 64.2 |
| 13 | ∞ | 0.0890 | | |

(b)
EXAMPLE 5 • ASPHERICAL SURFACE DATA

A/S COEFF. S1

| KA | −6.107932E−01 |
| RA4 | 2.428613E−02 |
| RA6 | −1.848037E−03 |
| RA8 | 8.977338E−05 |
| RA10 | −6.572286E−05 |

A/S COEFF. S2

| KA | −1.847690E−01 |
| RA4 | 2.332814E−02 |
| RA6 | 2.745246E−03 |

TABLE 5-continued

| | |
|---|---|
| RA8 | −3.554416E−04 |
| RA10 | −1.473054E−04 |
| A/S COEFF. S3 | |
| KA | 5.901037E−01 |
| RA3 | −3.971974E−03 |
| RA4 | 3.570397E−03 |
| RA5 | −5.235463E−03 |
| RA6 | 5.563884E−03 |
| RA7 | 4.441802E−03 |
| RA8 | −1.235852E−02 |
| RA9 | 2.355361E−04 |
| RA10 | 1.551463E−03 |
| RA11 | −7.480081E−04 |
| RA12 | −1.080126E−02 |
| RA13 | 1.105417E−04 |
| RA14 | 3.759198E−03 |
| RA15 | 3.082359E−04 |
| RA16 | −6.983956E−04 |
| A/S COEFF. S4 | |
| KA | 1.000009E+00 |
| RA3 | −7.428815E−03 |
| RA4 | −5.467199E−03 |
| RA5 | −9.263358E−03 |
| RA6 | 7.396633E−03 |
| RA7 | 5.451319E−03 |
| RA8 | 1.013670E−03 |
| RA9 | −2.699983E−03 |
| RA10 | −2.378179E−03 |
| RA11 | 1.204678E−03 |
| RA12 | 1.159315E−03 |
| RA13 | −3.419068E−05 |
| RA14 | −8.956651E−04 |
| RA15 | 2.656654E−04 |
| RA16 | 0.000000E+00 |
| RA17 | 0.000000E+00 |
| RA18 | 0.000000E+00 |
| RA19 | 0.000000E+00 |
| RA20 | 0.000000E+00 |
| A/S COEFF. S6 | |
| KA | 6.310120E−02 |
| RA4 | −3.829015E−02 |
| RA6 | 8.738743E−02 |
| RA8 | −3.531131E−02 |
| RA10 | −2.565177E−02 |
| RA12 | 8.578194E−03 |
| RA14 | 5.590527E−02 |
| RA16 | −4.521175E−02 |
| A/S COEFF. S7 | |
| KA | 2.106316E−01 |
| RA4 | −9.502098E−02 |
| RA6 | 1.579883E−01 |
| RA8 | −1.111214E−01 |
| RA10 | 7.655667E−02 |
| RA12 | −2.914876E−02 |
| RA14 | −3.530397E−03 |
| RA16 | 5.444274E−03 |
| A/S COEFF. S8 | |
| KA | 6.103261E−01 |
| RA4 | −1.337089E−01 |
| RA6 | 7.540084E−02 |
| RA8 | −4.236354E−02 |
| RA10 | 1.060092E−02 |
| RA12 | 1.606645E−03 |
| RA14 | −2.337278E−03 |
| RA16 | 6.467468E−04 |
| A/S COEFF. S9 | |
| KA | 1.300090E−01 |
| RA4 | −2.835569E−02 |
| RA6 | −1.753996E−02 |
| RA8 | 1.600633E−02 |
| RA10 | −4.804559E−03 |
| RA12 | −1.459053E−03 |
| RA14 | 9.913261E−04 |
| RA16 | −1.316843E−04 |

TABLE 5-continued

| | |
|---|---|
| A/S COEFF. S10 | |
| KA | −3.479209E+01 |
| RA4 | −1.677785E−01 |
| RA6 | 5.048808E−02 |
| RA8 | −1.442422E−03 |
| RA10 | −1.897740E−03 |
| A/S COEFF. S11 | |
| KA | −2.569436E+01 |
| RA4 | −7.601736E−02 |
| RA6 | 1.427084E−02 |
| RA8 | −6.990032E−04 |
| RA10 | −1.607618E−04 |

*ASPHERICAL SURFACE
R-CUR.: RADIUS OF CURVATURE
S-DIST.: SURFACE DISTANCE
A-stop: APERTURE STOP
f = 4.392 FNo. = 1.84 2ω = 55.8°

TABLE 6

(a)
EXAMPLE 6 • BASIC LENS DATA

| Si (S-No.) | Ri (R-CUR.) | Di (S-DIST.) | Ndj (R-INDEX) | vdj (ABBE No.) |
|---|---|---|---|---|
| *1 | −5.8522 | 0.5050 | 1.6317 | 23.3 |
| *2 | −12.9913 | 0.1000 | | |
| *3 | 1.8384 | 1.2430 | 1.5691 | 57.9 |
| *4 | −13.5572 | −0.0140 | | |
| 5 | ∞(A-stop) | 0.7870 | | |
| *6 | −1.9869 | 0.5700 | 1.6317 | 23.3 |
| *7 | −5.6552 | 0.3360 | | |
| *8 | 2.7081 | 0.7480 | 1.5311 | 55.3 |
| *9 | 46.5321 | 0.5680 | | |
| *10 | −8.3124 | 0.4300 | 1.5311 | 55.3 |
| *11 | 2.9480 | 0.5050 | | |
| 12 | ∞ | 0.1500 | 1.5168 | 64.2 |
| 13 | ∞ | 0.0660 | | |

(b)
EXAMPLE 6 • ASPHERICAL SURFACE DATA

| | |
|---|---|
| A/S COEFF. S1 | |
| KA | −6.073705E−01 |
| RA4 | 2.287208E−02 |
| RA6 | −1.697951E−03 |
| RA8 | 9.474472E−05 |
| RA10 | −6.644061E−05 |
| A/S COEFF. S2 | |
| KA | −1.905279E−01 |
| RA4 | 2.710676E−02 |
| RA6 | 2.892146E−03 |
| RA8 | −3.745882E−04 |
| RA10 | −2.487374E−05 |
| A/S COEFF. S3 | |
| KA | 1.000000E+00 |
| RA3 | −2.634395E−03 |
| RA4 | 8.648176E−04 |
| RA5 | −5.381809E−03 |
| RA6 | 3.345940E−03 |
| RA7 | 2.770392E−03 |
| RA8 | −5.397687E−03 |
| RA9 | 1.815730E−04 |
| RA10 | 5.910674E−03 |
| RA11 | −4.109920E−04 |
| RA12 | −3.516904E−03 |
| RA13 | 6.986981E−06 |
| RA14 | 9.771793E−04 |
| RA15 | 1.143891E−04 |
| RA16 | −7.726584E−05 |

TABLE 6-continued

| A/S COEFF. S4 | |
|---|---|
| KA | 1.000000E+00 |
| RA3 | −3.303328E−03 |
| RA4 | −4.869440E−03 |
| RA5 | −6.573862E−03 |
| RA6 | 5.240890E−03 |
| RA7 | 3.462952E−03 |
| RA8 | 1.397841E−03 |
| RA9 | −3.206194E−06 |
| RA10 | 4.960859E−04 |
| RA11 | 1.486206E−03 |
| RA12 | 8.707457E−04 |
| RA13 | −1.790178E−04 |
| RA14 | −1.133289E−03 |
| RA15 | −1.708515E−03 |
| RA16 | 0.000000E+00 |
| RA17 | 0.000000E+00 |
| RA18 | 0.000000E+00 |
| RA19 | 0.000000E+00 |
| RA20 | 0.000000E+00 |
| A/S COEFF. S6 | |
| KA | 5.792182E−02 |
| RA4 | −3.275703E−02 |
| RA6 | 8.160726E−02 |
| RA8 | −3.838460E−02 |
| RA10 | −3.016886E−02 |
| RA12 | 2.373142E−03 |
| RA14 | 4.850461E−02 |
| RA16 | −2.685843E−02 |
| A/S COEFF. S7 | |
| KA | 2.131149E−01 |
| RA4 | −8.834143E−02 |
| RA6 | 1.475965E−01 |
| RA8 | −1.082280E−01 |
| RA10 | 6.920765E−02 |
| RA12 | −2.555822E−02 |
| RA14 | −2.783606E−03 |
| RA16 | 4.240195E−03 |
| A/S COEFF. S8 | |
| KA | 6.112608E−01 |
| RA4 | −1.268090E−01 |
| RA6 | 7.265906E−02 |
| RA8 | −3.912788E−02 |
| RA10 | 1.003620E−02 |
| RA12 | 1.426221E−03 |
| RA14 | −2.268674E−03 |
| RA16 | 5.194271E−04 |
| A/S COEFF. S9 | |
| KA | 2.722022E−01 |
| RA4 | −2.718637E−02 |
| RA6 | −1.636768E−02 |
| RA8 | 1.571206E−02 |
| RA10 | −4.224071E−03 |
| RA12 | −1.288271E−03 |
| RA14 | 8.261258E−04 |
| RA16 | −1.204588E−04 |
| A/S COEFF. S10 | |
| KA | −3.492171E+01 |
| RA4 | −1.634840E−01 |
| RA6 | 4.865499E−02 |
| RA8 | −2.541647E−03 |
| RA10 | −1.344589E−03 |
| A/S COEFF. S11 | |
| KA | −2.567483E+01 |
| RA4 | −7.268591E−02 |
| RA6 | 1.315563E−02 |

TABLE 6-continued

| | |
|---|---|
| RA8 | −8.132254E−04 |
| RA10 | −1.556173E−04 |

*ASPHERICAL SURFACE
R-CUR.: RADIUS OF CURVATURE
S-DIST.: SURFACE DISTANCE
A-stop: APERTURE STOP
f = 4.456 FNo. = 2.27 2ω = 55.1°

TABLE 7

(a)
EXAMPLE 7 • BASIC LENS DATA

| Si (S-No.) | Ri (R-CUR.) | Di (S-DIST.) | Ndj (R-INDEX) | νdj (ABBE No.) |
|---|---|---|---|---|
| *1 | −5.7381 | 0.5050 | 1.6317 | 23.3 |
| *2 | −14.3878 | 0.1000 | | |
| *3 | 1.8321 | 1.3520 | 1.5860 | 55.5 |
| *4 | −11.7833 | −0.0090 | | |
| 5 | ∞(A-stop) | 0.7100 | | |
| *6 | −2.0065 | 0.5760 | 1.6317 | 23.3 |
| *7 | −5.4034 | 0.3380 | | |
| *8 | 2.7493 | 0.6960 | 1.5311 | 55.3 |
| *9 | 27.7965 | 0.5000 | | |
| *10 | −7.6088 | 0.4020 | 1.5311 | 55.3 |
| *11 | 2.9915 | 0.5050 | | |
| 12 | ∞ | 0.1500 | 1.5168 | 64.2 |
| 13 | ∞ | 0.0860 | | |

(b)
EXAMPLE 7 • ASPHERICAL SURFACE DATA

| A/S COEFF. S1 | |
|---|---|
| KA | −5.657449E−01 |
| RA4 | 2.300173E−02 |
| RA6 | −1.679840E−03 |
| RA8 | 1.640051E−04 |
| RA10 | −8.423025E−05 |
| A/S COEFF. S2 | |
| KA | −2.000086E−01 |
| RA4 | 2.733908E−02 |
| RA6 | 2.704777E−03 |
| RA8 | −4.111544E−04 |
| RA10 | −3.900357E−05 |
| A/S COEFF. S3 | |
| KA | 1.000000E+00 |
| RA4 | −5.094552E−03 |
| RA6 | 3.344189E−04 |
| RA8 | 1.018824E−04 |
| RA10 | −7.303170E−04 |
| A/S COEFF. S4 | |
| KA | 1.000000E+00 |
| RA4 | −1.492770E−02 |
| RA6 | 3.180139E−03 |
| RA8 | 2.491988E−04 |
| RA10 | −9.277339E−04 |
| A/S COEFF. S6 | |
| KA | 6.000158E−02 |
| RA4 | −4.035578E−02 |
| RA6 | 7.386463E−02 |
| RA8 | −3.297816E−02 |
| RA10 | −1.031532E−02 |
| RA12 | −9.518441E−02 |
| RA14 | 1.619912E−01 |
| RA16 | −7.122131E−02 |
| A/S COEFF. S7 | |
| KA | 5.675521E−01 |
| RA4 | −8.603765E−02 |
| RA6 | 1.470359E−01 |
| RA8 | −1.087831E−01 |

TABLE 7-continued

| | |
|---|---|
| RA10 | 6.918490E-02 |
| RA12 | -2.528967E-02 |
| RA14 | -2.642433E-03 |
| RA16 | 4.067004E-03 |
| A/S COEFF. S8 | |
| KA | 6.368519E-01 |
| RA4 | -1.300530E-01 |
| RA6 | 7.240746E-02 |
| RA8 | -3.885890E-02 |
| RA10 | 1.019404E-02 |
| RA12 | 1.306541E-03 |
| RA14 | -2.394940E-03 |
| RA16 | 5.971632E-04 |
| A/S COEFF. S9 | |
| KA | 2.722022E-01 |
| RA4 | -2.786537E-02 |
| RA6 | -1.679106E-02 |
| RA8 | 1.552880E-02 |
| RA10 | -4.203093E-03 |
| RA12 | -1.299921E-03 |
| RA14 | 8.711600E-04 |
| RA16 | -1.318162E-04 |
| A/S COEFF. S10 | |
| KA | -3.500001E+01 |
| RA4 | -1.572300E-01 |
| RA6 | 4.948221E-02 |
| RA8 | -2.319088E-03 |
| RA10 | -1.312526E-03 |
| A/S COEFF. S11 | |
| KA | -2.531578E+01 |
| RA4 | -7.066601E-02 |
| RA6 | 1.343866E-02 |
| RA8 | -7.215779E-04 |
| RA10 | -1.628118E-04 |

*ASPHERICAL SURFACE
R-CUR.: RADIUS OF CURVATURE
S-DIST.: SURFACE DISTANCE
A-stop: APERTURE STOP
f = 4.357 FNo. = 2.27 2ω = 56.2°

TABLE 8

(a)
EXAMPLE 8 • BASIC LENS DATA

| Si (S-No.) | Ri (R-CUR.) | Di (S-DIST.) | Ndj (R-INDEX) | νdj (ABBE No.) |
|---|---|---|---|---|
| *1 | -6.1068 | 0.6000 | 1.6317 | 23.3 |
| *2 | -11.7019 | 0.2000 | | |
| *3 | 1.7034 | 1.4270 | 1.5311 | 55.3 |
| *4 | -11.2437 | 0.3500 | | |
| 5 | ∞(A-stop) | 0.2630 | | |
| *6 | -2.1652 | 0.5080 | 1.6317 | 23.3 |
| *7 | 658.4209 | 0.3360 | | |
| *8 | 2.5071 | 0.6830 | 1.5311 | 55.3 |
| *9 | 42.2287 | 0.6130 | | |
| *10 | -8.3069 | 0.5160 | 1.5311 | 55.3 |
| *11 | 3.3057 | 0.5000 | | |
| 12 | ∞ | 0.1500 | 1.5168 | 64.2 |
| 13 | ∞ | 0.2080 | | |

(b)
EXAMPLE 8 • ASPHERICAL SURFACE DATA

| | |
|---|---|
| A/S COEFF. S1 | |
| KA | -6.100033E-01 |
| RA4 | 2.333229E-02 |
| RA6 | -2.290774E-03 |
| RA8 | -1.226842E-04 |
| RA10 | -8.751085E-06 |
| A/S COEFF. S2 | |
| KA | -1.858954E-01 |
| RA4 | 2.770630E-02 |
| RA6 | -9.397390E-04 |
| RA8 | -1.342802E-04 |
| RA10 | -1.187536E-04 |
| A/S COEFF. S3 | |
| KA | 5.904922E-01 |
| RA3 | -3.551070E-03 |
| RA4 | 9.750398E-03 |
| RA5 | -4.480356E-03 |
| RA6 | 4.491641E-03 |
| RA7 | 3.193690E-03 |
| RA8 | -1.277577E-02 |
| RA9 | 2.214175E-04 |
| RA10 | 1.598630E-02 |
| RA11 | -1.906330E-04 |
| RA12 | -1.075651E-02 |
| RA13 | -3.273244E-04 |
| RA14 | 3.855997E-03 |
| RA15 | 3.072908E-04 |
| RA16 | -6.990176E-04 |
| A/S COEFF. S4 | |
| KA | 1.000009E+00 |
| RA3 | -7.894105E-03 |
| RA4 | -6.131428E-03 |
| RA5 | -4.863263E-03 |
| RA6 | 1.044505E-02 |
| RA7 | 5.967595E-03 |
| RA8 | 4.178053E-05 |
| RA9 | -4.074298E-03 |
| RA10 | -1.413633E-03 |
| RA11 | 1.155507E-04 |
| RA12 | 5.806046E-04 |
| RA13 | -2.775073E-04 |
| RA14 | 1.568898E-04 |
| A/S COEFF. S6 | |
| KA | 6.232428E-02 |
| RA4 | -2.284615E-02 |
| RA6 | 9.551314E-02 |
| RA8 | -6.226576E-02 |
| RA10 | -2.913303E-02 |
| RA12 | 2.851767E-02 |
| RA14 | 8.952182E-02 |
| RA16 | -9.926300E-02 |
| A/S COEFF. S7 | |
| KA | 1.839204E-01 |
| RA4 | -8.308892E-02 |
| RA6 | 1.694078E-01 |
| RA8 | -1.205523E-01 |
| RA10 | 7.983123E-02 |
| RA12 | -2.944448E-02 |
| RA14 | -8.160941E-03 |
| RA16 | 6.302686E-03 |
| A/S COEFF. S8 | |
| KA | 6.098320E-01 |
| RA4 | -1.328684E-01 |
| RA6 | 7.828980E-02 |
| RA8 | -4.282315E-02 |
| RA10 | 9.522967E-03 |
| RA12 | 1.656872E-03 |
| RA14 | -1.244773E-03 |
| RA16 | -8.422829E-05 |
| A/S COEFF. S9 | |
| KA | 5.300000E-06 |
| RA4 | -2.112957E-02 |
| RA6 | -1.633804E-02 |
| RA8 | 1.594330E-02 |
| RA10 | -4.583704E-03 |
| RA12 | -1.310706E-03 |

TABLE 8-continued

| | |
|---|---|
| RA14 | 8.568111E−04 |
| RA16 | −1.329612E−04 |
| A/S COEFF. S10 | |
| KA | −3.500001E+01 |
| RA4 | −1.659958E−01 |
| RA6 | 4.824229E−02 |
| RA8 | −4.288711E−03 |
| RA10 | −5.561116E−04 |
| A/S COEFF. S11 | |
| KA | −2.570001E+01 |
| RA4 | −8.289319E−02 |
| RA6 | 1.242663E−02 |
| RA8 | −4.426176E−04 |
| RA10 | −1.858556E−04 |

*ASPHERICAL SURFACE
R-CUR.: RADIUS OF CURVATURE
S-DIST.: SURFACE DISTANCE
A-stop: APERTURE STOP
f = 4.942 FNo. = 2.01 2ω = 50.3°

TABLE 9

(a)
EXAMPLE 9 • BASIC LENS DATA

| Si (S-No.) | Ri (R-CUR.) | Di (S-DIST.) | Ndj (R-INDEX) | vdj (ABBE No.) |
|---|---|---|---|---|
| *1 | −96.4029 | 0.5000 | 1.4700 | 60.6 |
| *2 | 10.0011 | 0.2000 | | |
| *3 | 1.8356 | 1.2790 | 1.4714 | 76.6 |
| *4 | −6.5808 | 0.2500 | | |
| 5 | ∞(A-stop) | 0.4220 | | |
| *6 | −2.2409 | 0.7460 | 1.6317 | 23.3 |
| *7 | −4.3618 | 0.3910 | | |
| *8 | 1.4372 | 0.4790 | 1.5311 | 55.3 |
| *9 | 1.5690 | 0.5500 | | |
| *10 | 2.0501 | 0.4950 | 1.5311 | 55.3 |
| *11 | 1.5246 | 0.5000 | | |
| 12 | ∞ | 0.1500 | 1.5168 | 64.2 |
| 13 | ∞ | 0.2580 | | |

(b)
EXAMPLE 9 • ASPHERICAL SURFACE DATA

| A/S COEFF. S1 | |
|---|---|
| KA | −1.000003E+00 |
| RA4 | 1.996873E−02 |
| RA6 | −3.230191E−03 |
| RA8 | 7.307883E−04 |
| RA10 | −2.116638E−04 |
| A/S COEFF. S2 | |
| KA | 1.000009E+00 |
| RA4 | 1.746525E−02 |
| RA6 | 5.077509E−03 |
| RA8 | −1.248529E−03 |
| RA10 | 5.963063E−05 |
| A/S COEFF. S3 | |
| KA | 6.256973E−01 |
| RA3 | −7.490475E−03 |
| RA4 | −3.518964E−03 |
| RA5 | −9.701229E−03 |
| RA6 | 3.363259E−03 |
| RA7 | 3.714673E−03 |
| RA8 | −1.207365E−02 |
| RA9 | −1.620748E−04 |
| RA10 | 1.503364E−03 |
| RA11 | −1.143372E−03 |
| RA12 | −1.102690E−02 |
| RA13 | 5.585000E−05 |
| RA14 | 3.823575E−03 |

TABLE 9-continued

| | |
|---|---|
| RA15 | 3.000596E−04 |
| RA16 | −7.057970E−04 |
| A/S COEFF. S4 | |
| KA | −9.000000E−06 |
| RA3 | −1.285178E−02 |
| RA4 | −7.956240E−03 |
| RA5 | −1.827351E−02 |
| RA6 | −2.178201E−03 |
| RA7 | 3.440425E−03 |
| RA8 | 2.672404E−03 |
| RA9 | 5.827101E−04 |
| RA10 | −1.137998E−03 |
| RA11 | 1.085504E−03 |
| RA12 | 1.426497E−04 |
| RA13 | −1.140568E−03 |
| RA14 | −1.308543E−03 |
| RA15 | 1.088037E−03 |
| RA16 | 0.000000E+00 |
| RA17 | 0.000000E+00 |
| RA18 | 0.000000E+00 |
| RA19 | 0.000000E+00 |
| RA20 | 0.000000E+00 |
| A/S COEFF. S6 | |
| KA | 3.371870E−03 |
| RA4 | −3.668338E−02 |
| RA6 | 4.450658E−02 |
| RA8 | −9.130150E−03 |
| RA10 | 1.076602E−02 |
| RA12 | −3.588806E−03 |
| RA14 | −1.044375E−03 |
| RA16 | −7.337639E−04 |
| A/S COEFF. S7 | |
| KA | 3.740760E−03 |
| RA4 | −1.026948E−01 |
| RA6 | 1.431066E−01 |
| RA8 | −1.064429E−01 |
| RA10 | 7.103044E−02 |
| RA12 | −2.646006E−02 |
| RA14 | 5.321897E−03 |
| RA16 | −5.053051E−04 |
| A/S COEFF. S8 | |
| KA | 3.314790E−01 |
| RA4 | −1.424289E−01 |
| RA6 | 4.945239E−02 |
| RA8 | −1.970433E−02 |
| RA10 | 3.180614E−03 |
| RA12 | 1.835135E−04 |
| RA14 | −6.344649E−05 |
| RA16 | −8.264792E−06 |
| A/S COEFF. S9 | |
| KA | 1.249248E−01 |
| RA4 | −6.931654E−02 |
| RA6 | 4.720765E−03 |
| RA8 | 1.058858E−03 |
| RA10 | −3.168708E−04 |
| RA12 | −4.122942E−04 |
| RA14 | 1.783107E−04 |
| RA16 | −2.499046E−05 |
| A/S COEFF. S10 | |
| KA | −9.805115E+00 |
| RA4 | −6.962486E−02 |
| RA6 | 1.809940E−02 |
| RA8 | 1.447157E−03 |
| RA10 | −7.849002E−04 |
| A/S COEFF. S11 | |
| KA | −6.465356E+00 |
| RA4 | −4.057490E−02 |
| RA6 | 5.816188E−04 |

TABLE 9-continued

| | |
|---|---|
| RA8 | 2.014889E-03 |
| RA10 | -2.424921E-04 |

*ASPHERICAL SURFACE
R-CUR.: RADIUS OF CURVATURE
S-DIST.: SURFACE DISTANCE
A-stop: APERTURE STOP
f = 4.222 FNo. = 1.71 2ω = 55.7°

TABLE 10

(a)
EXAMPLE 10 • BASIC LENS DATA

| Si (S-No.) | Ri (R-CUR.) | Di (S-DIST.) | Ndj (R-INDEX) | νdj (ABBE No.) |
|---|---|---|---|---|
| *1 | -50.0435 | 0.5000 | 1.6300 | 61.0 |
| *2 | 10.0035 | 0.2000 | | |
| *3 | 1.9307 | 1.4940 | 1.4714 | 76.6 |
| *4 | -3.9239 | 0.2500 | | |
| 5 | ∞(A-stop) | 0.2520 | | |
| *6 | -2.4317 | 0.9840 | 1.6317 | 23.3 |
| *7 | -9.9502 | 0.3620 | | |
| *8 | 1.5603 | 0.7020 | 1.5311 | 55.3 |
| *9 | 2.2143 | 0.5500 | | |
| *10 | 1.7423 | 0.4950 | 1.5311 | 55.3 |
| *11 | 1.2596 | 0.5000 | | |
| 12 | ∞ | 0.1500 | 1.5168 | 64.2 |
| 13 | ∞ | 0.3110 | | |

(b)
EXAMPLE 10 • ASPHERICAL SURFACE DATA

A/S COEFF. S1

| | |
|---|---|
| KA | -1.000000E+00 |
| RA4 | 2.149502E-02 |
| RA6 | -4.214317E-03 |
| RA8 | 1.469815E-03 |
| RA10 | -3.711565E-04 |

A/S COEFF. S2

| | |
|---|---|
| KA | 9.999985E-01 |
| RA4 | -4.804649E-03 |
| RA6 | 1.125896E-02 |
| RA8 | -2.504585E-03 |
| RA10 | -5.820203E-04 |

A/S COEFF. S3

| | |
|---|---|
| KA | 7.242164E-02 |
| RA3 | -3.552618E-03 |
| RA4 | -4.147051E-02 |
| RA5 | -4.156146E-03 |
| RA6 | 1.233793E-02 |
| RA7 | 4.576772E-03 |
| RA8 | -1.499988E-02 |
| RA9 | -2.895869E-03 |
| RA10 | 1.371616E-02 |
| RA11 | -1.328269E-03 |
| RA12 | -1.068527E-02 |
| RA13 | 4.729615E-04 |
| RA14 | 4.083855E-03 |
| RA15 | 2.996741E-04 |
| RA16 | -9.587657E-04 |

A/S COEFF. S4

| | |
|---|---|
| KA | -9.000000E-06 |
| RA3 | -6.727301E-03 |
| RA4 | -3.549669E-02 |
| RA5 | -1.018737E-02 |
| RA6 | 5.171926E-03 |
| RA7 | 2.941031E-03 |
| RA8 | -7.971867E-04 |

TABLE 10-continued

| | |
|---|---|
| RA9 | -1.863023E-03 |
| RA10 | -1.738561E-03 |
| RA11 | 1.772457E-03 |
| RA12 | 1.159746E-03 |
| RA13 | -4.567773E-04 |
| RA14 | -1.235446E-03 |
| RA15 | 5.948850E-04 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| | |
|---|---|
| KA | 1.607429E-01 |
| RA4 | -3.383740E-02 |
| RA6 | 4.363461E-02 |
| RA8 | -1.116101E-02 |
| RA10 | 5.791420E-03 |
| RA12 | -3.515978E-03 |
| RA14 | 3.728751E-03 |
| RA16 | -2.055259E-03 |

A/S COEFF. S7

| | |
|---|---|
| KA | 1.535707E-01 |
| RA4 | -1.218655E-01 |
| RA6 | 1.362438E-01 |
| RA8 | -1.046258E-01 |
| RA10 | 6.880621E-02 |
| RA12 | -2.820218E-02 |
| RA14 | 6.064083E-03 |
| RA16 | -4.319898E-04 |

A/S COEFF. S8

| | |
|---|---|
| KA | 3.931122E-01 |
| RA4 | -1.322510E-01 |
| RA6 | 5.643289E-02 |
| RA8 | -2.442652E-02 |
| RA10 | 4.079053E-03 |
| RA12 | 2.697657E-04 |
| RA14 | -1.575367E-04 |
| RA16 | -4.205819E-06 |

A/S COEFF. S9

| | |
|---|---|
| KA | 1.299905E-01 |
| RA4 | -4.010819E-02 |
| RA6 | 1.367051E-03 |
| RA8 | 1.315650E-03 |
| RA10 | -8.187036E-04 |
| RA12 | -3.835673E-04 |
| RA14 | 2.201980E-04 |
| RA16 | -3.450234E-05 |

A/S COEFF. S10

| | |
|---|---|
| KA | -4.863556E+00 |
| RA4 | -1.165184E-01 |
| RA6 | 2.285511E-02 |
| RA8 | 2.963427E-03 |
| RA10 | -1.293269E-03 |

A/S COEFF. S11

| | |
|---|---|
| KA | -3.277618E+00 |
| RA4 | -7.829240E-02 |
| RA6 | 1.625818E-02 |
| RA8 | -1.637891E-03 |
| RA10 | 6.743558E-05 |

*ASPHERICAL SURFACE
R-CUR.: RADIUS OF CURVATURE
S-DIST.: SURFACE DISTANCE
A-stop: APERTURE STOP
f = 4.217 FNo. = 1.68 2ω = 55.7°

TABLE 11

(a)
EXAMPLE 11 • BASIC LENS DATA

| Si (S-No.) | Ri (R-CUR.) | Di (S-DIST.) | Ndj (R-INDEX) | vdj (ABBE No.) |
|---|---|---|---|---|
| *1  | −4.3580 | 0.5000 | 1.5319 | 55.0 |
| *2  | −7.7635 | 0.2000 | | |
| *3  | 2.2274 | 1.0100 | 1.4714 | 76.6 |
| *4  | −4.2269 | 0.2500 | | |
| 5   | ∞(A-stop) | 0.3080 | | |
| *6  | −1.9509 | 0.5290 | 1.6317 | 23.3 |
| *7  | −5.0196 | 0.3430 | | |
| *8  | 1.5483 | 0.5730 | 1.5311 | 55.3 |
| *9  | 2.9742 | 0.5000 | | |
| *10 | 1.2432 | 0.4950 | 1.5311 | 55.3 |
| *11 | 1.0520 | 0.5000 | | |
| 12  | ∞ | 0.1500 | 1.5168 | 64.2 |
| 13  | ∞ | 0.4170 | | |

(b)
EXAMPLE 11 • ASPHERICAL SURFACE DATA

A/S COEFF. S1

| KA | −7.948900E−01 |
|---|---|
| RA4 | 3.101099E−02 |
| RA6 | −6.302003E−03 |
| RA8 | 1.141159E−03 |
| RA10 | −2.913239E−04 |

A/S COEFF. S2

| KA | 1.960000E−06 |
|---|---|
| RA4 | 6.347971E−03 |
| RA6 | 1.095542E−02 |
| RA8 | −5.929318E−03 |
| RA10 | 5.131714E−04 |

A/S COEFF. S3

| KA | 3.150000E−06 |
|---|---|
| RA3 | −5.840834E−03 |
| RA4 | −3.787749E−02 |
| RA5 | −3.152420E−02 |
| RA6 | 1.682276E−02 |
| RA7 | 1.336209E−02 |
| RA8 | −2.695738E−03 |
| RA9 | −3.507075E−03 |
| RA10 | 1.183774E−02 |
| RA11 | −1.046062E−03 |
| RA12 | −8.788216E−03 |
| RA13 | 1.604902E−04 |
| RA14 | 2.493547E−03 |
| RA15 | 1.562089E−03 |
| RA16 | −1.310308E−03 |

A/S COEFF. S4

| KA | −9.000000E−06 |
|---|---|
| RA3 | −3.996626E−03 |
| RA4 | −5.814418E−02 |
| RA5 | −2.427937E−02 |
| RA6 | 1.223894E−02 |
| RA7 | 1.502210E−02 |
| RA8 | 4.974285E−03 |
| RA9 | −2.574151E−03 |
| RA10 | −8.133301E−03 |
| RA11 | −5.173308E−03 |
| RA12 | −2.902555E−03 |
| RA13 | −1.516162E−05 |
| RA14 | 2.303461E−03 |
| RA15 | 2.856839E−03 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| KA | 2.737654E−01 |
|---|---|
| RA4 | −7.906938E−02 |
| RA6 | 8.210536E−02 |

TABLE 11-continued

| RA8 | 6.698407E−02 |
|---|---|
| RA10 | 9.698405E−02 |
| RA12 | −1.605391E−01 |
| RA14 | −4.029237E−01 |
| RA16 | 5.211697E−01 |

A/S COEFF. S7

| KA | 6.000090E−01 |
|---|---|
| RA4 | −1.834744E−01 |
| RA6 | 1.777867E−01 |
| RA8 | −8.323675E−02 |
| RA10 | 6.671458E−02 |
| RA12 | −4.387563E−02 |
| RA14 | −1.463579E−03 |
| RA16 | 1.118453E−02 |

A/S COEFF. S8

| KA | 4.261639E−01 |
|---|---|
| RA4 | −1.190222E−01 |
| RA6 | 6.025195E−02 |
| RA8 | −2.624234E−02 |
| RA10 | 5.383090E−03 |
| RA12 | −6.710637E−05 |
| RA14 | −1.978684E−04 |
| RA16 | −6.292903E−06 |

A/S COEFF. S9

| KA | 1.300066E−01 |
|---|---|
| RA4 | −7.943755E−03 |
| RA6 | −2.717100E−03 |
| RA8 | 3.424171E−03 |
| RA10 | −1.149640E−03 |
| RA12 | −4.473483E−04 |
| RA14 | 2.197564E−04 |
| RA16 | −3.549348E−05 |

A/S COEFF. S10

| KA | −2.100340E+00 |
|---|---|
| RA4 | −1.109938E−01 |
| RA6 | 1.058874E−02 |
| RA8 | 2.839153E−03 |
| RA10 | −8.905495E−04 |

A/S COEFF. S11

| KA | −1.687329E+00 |
|---|---|
| RA4 | −9.544687E−02 |
| RA6 | 2.261449E−02 |
| RA8 | −3.902381E−03 |
| RA10 | 2.429436E−04 |

*ASPHERICAL SURFACE
R-CUR.: RADIUS OF CURVATURE
S-DIST.: SURFACE DISTANCE
A-stop: APERTURE STOP
f = 3.282 FNo. = 2.40 2ω = 68.5°

TABLE 12

(a)
EXAMPLE 12 • BASIC LENS DATA

| Si (S-No.) | Ri (R-CUR.) | Di (S-DIST.) | Ndj (R-INDEX) | vdj (ABBE No.) |
|---|---|---|---|---|
| *1  | 9.9151 | 0.4000 | 1.4781 | 59.0 |
| *2  | 3.5133 | 0.2000 | | |
| *3  | 1.6390 | 1.4510 | 1.4714 | 76.6 |
| *4  | −6.7179 | 0.2500 | | |
| 5   | ∞(A-stop) | 0.4150 | | |
| *6  | −2.2746 | 0.7460 | 1.6317 | 23.3 |
| *7  | −5.2358 | 0.4260 | | |
| *8  | 1.4270 | 0.4580 | 1.5311 | 55.3 |
| *9  | 1.7514 | 0.5670 | | |
| *10 | 2.0746 | 0.4950 | 1.5311 | 55.3 |
| *11 | 1.3911 | 0.5000 | | |

TABLE 12-continued

| 12 | ∞ | 0.1500 | 1.5168 | 64.2 |
|---|---|---|---|---|
| 13 | ∞ | 0.2910 | | |

(b)
EXAMPLE 12 • ASPHERICAL SURFACE DATA

A/S COEFF. S1

| KA | −9.998163E−01 |
|---|---|
| RA4 | 2.650503E−02 |
| RA6 | −3.270837E−03 |
| RA8 | 1.967224E−03 |
| RA10 | −5.997777E−04 |

A/S COEFF. S2

| KA | 9.491942E−01 |
|---|---|
| RA4 | 8.867462E−03 |
| RA6 | 1.421405E−02 |
| RA8 | 1.411518E−03 |
| RA10 | −7.341323E−04 |

A/S COEFF. S3

| KA | 4.262614E−01 |
|---|---|
| RA3 | −3.373727E−03 |
| RA4 | −2.241915E−02 |
| RA5 | −1.739734E−03 |
| RA6 | 8.690515E−03 |
| RA7 | 5.330798E−03 |
| RA8 | −1.188336E−02 |
| RA9 | −8.629693E−05 |
| RA10 | 1.519245E−02 |
| RA11 | −1.012525E−03 |
| RA12 | −1.097409E−02 |
| RA13 | 4.796063E−05 |
| RA14 | 3.794206E−03 |
| RA15 | 2.990946E−04 |
| RA16 | −6.739258E−04 |

A/S COEFF. S4

| KA | −9.000000E−06 |
|---|---|
| RA3 | −5.840837E−03 |
| RA4 | −2.424666E−02 |
| RA5 | −1.134977E−02 |
| RA6 | 4.538245E−03 |
| RA7 | 4.060084E−03 |
| RA8 | 8.225464E−04 |
| RA9 | −1.068835E−03 |
| RA10 | −1.514440E−03 |
| RA11 | 1.505388E−03 |
| RA12 | 7.967280E−04 |
| RA13 | −6.822566E−04 |
| RA14 | −1.243065E−03 |
| RA15 | 7.546759E−04 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| KA | 3.653217E−01 |
|---|---|
| RA4 | −5.673570E−02 |
| RA6 | 6.224819E−02 |
| RA8 | −1.939603E−02 |

TABLE 12-continued

| RA10 | 1.787406E−03 |
|---|---|
| RA12 | 9.181866E−04 |
| RA14 | 7.640397E−03 |
| RA16 | −6.560572E−03 |

A/S COEFF. S7

| KA | 6.000043E−01 |
|---|---|
| RA4 | −1.237392E−01 |
| RA6 | 1.458603E−01 |
| RA8 | −1.055094E−01 |
| RA10 | 7.011924E−02 |
| RA12 | −2.733026E−02 |
| RA14 | 5.374008E−03 |
| RA16 | −4.454437E−04 |

A/S COEFF. S8

| KA | 3.430804E−01 |
|---|---|
| RA4 | −1.322035E−01 |
| RA6 | 4.766093E−02 |
| RA8 | −2.190906E−02 |
| RA10 | 3.567900E−03 |
| RA12 | 2.730962E−04 |
| RA14 | −1.110449E−04 |
| RA16 | −1.172026E−05 |

A/S COEFF. S9

| KA | 8.513240E−02 |
|---|---|
| RA4 | −4.586282E−02 |
| RA6 | 5.053016E−04 |
| RA8 | 5.843790E−04 |
| RA10 | −4.116363E−04 |
| RA12 | −3.272174E−04 |
| RA14 | 2.102485E−04 |
| RA16 | −4.016296E−05 |

A/S COEFF. S10

| KA | −1.018019E+01 |
|---|---|
| RA4 | −1.150474E−01 |
| RA6 | 3.127311E−02 |
| RA8 | 2.086232E−03 |
| RA10 | −1.344912E−03 |

A/S COEFF. S11

| KA | −5.483391E+00 |
|---|---|
| RA4 | −7.450065E−02 |
| RA6 | 1.222719E−02 |
| RA8 | −4.242155E−04 |
| RA10 | −4.442124E−05 |

*ASPHERICAL SURFACE
R-CUR.: RADIUS OF CURVATURE
S-DIST.: SURFACE DISTANCE
A-stop: APERTURE STOP
f = 4.478 FNo. = 1.71 2ω = 52.9°

TABLE 13

| C/E SYMBOL | C/E (INEQUALITY) | EXAMPLE 1 | EXAMPLE 2 | EXAMPLE 3 | EXAMPLE 4 | EXAMPLE 5 | EXAMPLE 6 |
|---|---|---|---|---|---|---|---|
| | | VALUE OF FORMULA IN CONDITIONAL EXPRESSION (C/E) | | | | | |
| (1a) | $-1.5 < f/R2 < 1.6$ | −0.161 | −0.163 | −0.230 | −0.538 | −0.347 | −0.343 |
| (1b) | $-1.0 < f/R2 < 1.6$ | −0.161 | −0.163 | −0.230 | −0.538 | −0.347 | −0.343 |
| (2a) | $-1.6 < f/R4 < 0.05$ | 0.0170 | 0.0201 | −0.0976 | 0.000739 | −0.373 | −0.328 |
| (2b) | $-1.4 < f/R4 < 0.05$ | 0.0170 | 0.0201 | −0.0976 | 0.000739 | −0.373 | −0.328 |
| (3a) | $0.95 \leq f4/f \leq 4.3$ | 3.87 | 3.95 | 1.91 | 3.62 | 1.28 | 1.20 |
| (3b) | $0.95 \leq f4/f \leq 2.1$ | ◆3.87 | ◆3.95 | 1.91 | ◆3.62 | 1.28 | 1.20 |
| (4a) | $0.55 \leq f12/f \leq 5.0$ | 0.923 | 0.921 | 0.914 | 0.730 | 0.753 | 0.749 |
| (4b) | $0.60 \leq f12/f \leq 1.30$ | 0.923 | 0.921 | 0.914 | 0.730 | 0.753 | 0.749 |
| (4c) | $0.65 \leq f12/f \leq 1.30$ | 0.923 | 0.921 | 0.914 | 0.730 | 0.753 | 0.749 |
| (5a) | $1.0 \leq TL/f \leq 2.2$ | 1.42 | 1.42 | | 1.27 | 1.37 | 1.33 |
| (6a) | $0.1 \leq Bf/f \leq 0.5$ | 0.200 | 0.201 | 0.300 | 0.151 | 0.157 | 0.150 |
| (7a) | $-12 < (R1 + R2)/(R1 - R2) < -0.21$ | −7.98 | −8.74 | −5.35 | −9.06 | −2.74 | −2.64 |
| (8a) | $18 < \nu1 < 50$ | 23.9 | 23.9 | ◆56.0 | 20.0 | 23.3 | 23.3 |
| (9a) | $0.25 < (Dg2 + Dg3)/f < 0.7$ | 0.425 | 0.425 | 0.500 | 0.420 | 0.437 | 0.407 |
| (9b) | $0.45 < (Dg2 + Dg3)/f < 0.6$ | ◆0.425 | ◆0.425 | 0.500 | ◆0.420 | ◆0.437 | ◆0.407 |
| (10a) | $50 < \nu4 < 65$ | 55.4 | 55.4 | 55.3 | 55.3 | 55.3 | 55.3 |
| (11a) | $50 < \nu5 < 65$ | 55.4 | 55.4 | 55.3 | 55.3 | 55.3 | 55.3 |
| (12a) | $-4.0 < \Sigma(fj/\nu j)/f < 4.0$ | −1.19 | −1.30 | −1.67 | −0.501 | −0.208 | −0.198 |
| (12b) | $-2.0 < \Sigma(fj/\nu j)/f < 0.5$ | −1.19 | −1.30 | −1.67 | −0.501 | −0.208 | −0.198 |

| C/E SYMBOL | C/E (INEQUALITY) | EXAMPLE 7 | EXAMPLE 8 | EXAMPLE 9 | EXAMPLE 10 | EXAMPLE 11 | EXAMPLE 12 |
|---|---|---|---|---|---|---|---|
| | | VALUE OF FORMULA IN CONDITIONAL EXPRESSION (C/E) | | | | | |
| (1a) | $-1.5 < f/R2 < 1.6$ | −0.303 | −0.422 | 0.420 | 0.421 | −0.422 | 1.37 |
| (1b) | $-1.0 < f/R2 < 1.6$ | −0.303 | −0.422 | 0.420 | 0.421 | −0.422 | 1.37 |
| (2a) | $-1.6 < f/R4 < 0.05$ | −0.369 | −0.440 | −0.639 | −1.07 | −0.775 | −0.715 |
| (2b) | $-1.4 < f/R4 < 0.05$ | −0.369 | −0.440 | −0.639 | −1.07 | −0.775 | −0.715 |
| (3a) | $0.95 \leq f4/f \leq 4.3$ | 1.30 | 1.00 | 3.39 | 1.71 | 1.62 | 2.02 |
| (3b) | $0.95 \leq f4/f \leq 2.1$ | 1.30 | 1.00 | ◆3.39 | 1.71 | 1.62 | 2.02 |
| (4a) | $0.55 \leq f12/f \leq 5.0$ | 0.742 | 0.637 | 0.887 | 0.862 | 1.10 | 0.801 |
| (4b) | $0.60 \leq f12/f \leq 1.30$ | 0.742 | 0.637 | 0.887 | 0.862 | 1.10 | 0.801 |
| (4c) | $0.65 \leq f12/f \leq 1.30$ | 0.742 | ◆0.637 | 0.887 | 0.862 | 1.10 | 0.801 |
| (5a) | $1.0 \leq TL/f \leq 2.2$ | 1.35 | 1.27 | 1.46 | 1.59 | 1.75 | 1.35 |
| (6a) | $0.1 \leq Bf/f \leq 0.5$ | 0.158 | 0.163 | 0.201 | 0.215 | 0.309 | 0.310 |
| (7a) | $-12 < (R1 + R2)/(R1 - R2) < -0.21$ | −2.33 | −3.18 | ◆0.812 | ◆0.667 | −3.56 | ◆2.10 |
| (8a) | $18 < \nu1 < 50$ | 23.3 | 23.3 | ◆60.6 | ◆61.0 | ◆55.0 | ◆59.1 |
| (9a) | $0.25 < (Dg2 + Dg3)/f < 0.7$ | 0.443 | 0.391 | 0.482 | 0.588 | 0.470 | 0.457 |
| (9b) | $0.45 < (Dg2 + Dg3)/f < 0.6$ | ◆0.443 | ◆0.391 | 0.482 | 0.588 | 0.470 | 0.457 |
| (10a) | $50 < \nu4 < 65$ | 55.3 | 55.3 | 55.3 | 55.3 | 55.3 | 55.3 |
| (11a) | $50 < \nu5 < 65$ | 55.3 | 55.3 | 55.3 | 55.3 | 55.3 | 55.3 |
| (12a) | $-4.0 < \Sigma(fj/\nu j)/f < 4.0$ | −0.185 | −0.198 | −0.162 | −0.122 | −0.849 | −0.0987 |
| (12b) | $-2.0 < \Sigma(fj/\nu j)/f < 0.5$ | −0.185 | −0.198 | −0.162 | −0.122 | −0.849 | −0.0987 |

◆VALUE OUTSIDE OF C/E RANGE

What is claimed is:

1. An image capturing lens substantially consisting of a first lens having a negative refractive power, a second lens having a positive refractive power, a third lens having a negative refractive power, a fourth lens having a positive refractive power, and a fifth lens having a negative refractive power, arranged in this order from the object side, wherein:

the image side surface of the fifth lens has an aspherical shape with one or more inflection points and a concave shape toward the image side in a paraxial region; and the image capturing lens satisfies the following conditional expressions (1a), (2a), (3a), (5a), and (12b) simultaneously:

$$-1.5 < f/R2 < 1.6 \quad (1a);$$

$$-1.6 < f/R4 < 0.05 \quad (2a);$$

$$0.95 \leq f4/f \leq 4.3 \quad (3a),$$

$$1.0 \leq TL/f \leq 2.2 \quad (5a); \text{ and}$$

$$-2.0 < \Sigma(fj/\nu j)/f < 0.5 \quad (12b),$$

where:

f is a focal length of the entire lens system;

R2 is a radius of curvature of the image side surface of the first lens;

R4 is a radius of curvature of the image side surface of the second lens;

f4 is a focal length of the fourth lens;

TL is an overall optical length when a distance from the image side surface of the fifth lens to the image plane is represented by an air equivalent length;

$\Sigma(fj/\nu j)/f$ is $[(f1/\nu 1)+(f2/\nu 2)+(f3/\nu 3)+(f4/\nu 4)+(f5/\nu 5)]/f$;

f1 is a focal length of the first lens;

f2 is a focal length of the second lens;

f3 is a focal length of the third lens;

f5 is a focal length of the fifth lens;

$\nu 1$ is an Abbe number of the first lens;

$\nu 2$ is an Abbe number of the second lens;

$\nu 3$ is an Abbe number of the third lens;

$\nu 4$ is an Abbe number of the fourth lens; and $\nu 5$ is an Abbe number of the fifth lens.

2. The image capturing lens of claim 1, wherein the lens satisfies the following conditional expression (4a):

$$0.55 \leq f12/f \leq 5.0 \quad (4a),$$

where f12 is a combined focal length of the first and second lenses.

3. The image capturing lens of claim 1, wherein the lens satisfies the following conditional expression (6a):

$$0.1 \leq Bf/f \leq 0.5 \quad (6a),$$

where Bf is a back focus when a distance from the image side surface of the fifth lens to the image plane is represented by an air equivalent length.

4. The image capturing lens of claim 1, wherein the image side surface of the fourth lens is a convex or planar surface in a paraxial region.

5. The image capturing lens of claim 1, wherein the lens satisfies the following conditional expression (7a):

$$-12 < (R1+R2)/(R1-R2) < -0.21 \quad (7a),$$

where:
R1 is a radius of curvature of the object side surface of the first lens (first lens surface); and
R2 is a radius of curvature of the image side surface of the first lens (second lens surface).

6. The image capturing lens of claim 1, wherein the lens satisfies the following conditional expression (8a):

$$18 < v1 < 50 \quad (8a),$$

where v1 is an Abbe number of the first lens.

7. The image capturing lens of claim 1, wherein the lens satisfies the following conditional expression (9a):

$$0.25 < (Dg2+Dg3)/f < 0.7 \quad (9a),$$

where:
Dg2 is an axial thickness of the second lens (a distance between the object side surface and image side surface of the second lens on the optical axis; actual length); and
Dg3 is an axial thickness of the third lens (a distance between the object side surface and image side surface of the third lens on the optical axis; actual length).

8. The image capturing lens of claim 1, wherein the lens satisfies the following conditional expression (10a):

$$50 < v4 < 65 \quad (10a),$$

where v4 is an Abbe number of the fourth lens.

9. The image capturing lens of claim 1, wherein the lens satisfies the following conditional expression (12a):

$$-4.0 < \Sigma(fj/vj)/f < 4.0 \quad (12a),$$

where $\Sigma(fj/vj)/f$ is $[(f1/v1)+(f2/v2)+(f3/v3)+(f4/v4)+(f5/v5)]/f$.

10. The image capturing lens of claim 1, wherein the lens satisfies the following conditional expression (1b):

$$-1.0 < f/R2 < 1.6 \quad (1b).$$

11. The image capturing lens of claim 1, wherein the lens satisfies the following conditional expression (2b):

$$-1.4 < f/R4 < 0.05 \quad (2b).$$

12. The image capturing lens of claim 1, wherein the lens satisfies the following conditional expression (3b):

$$0.95 \leq f4/f \leq 2.1 \quad (3b).$$

13. The image capturing lens of claim 1, wherein the lens satisfies the following conditional expression (4b):

$$0.60 \leq f12/f \leq 1.30 \quad (4b),$$

where f12 is a combined focal length of the first and second lenses.

14. The image capturing lens of claim 1, wherein the lens satisfies the following conditional expression (4c):

$$0.65 \leq f12/f \leq 1.30 \quad (4c),$$

where f12 is a combined focal length of the first and second lenses.

15. The image capturing lens of claim 1, wherein the lens satisfies the following conditional expression (9b):

$$0.45 < (Dg2+Dg3)/f < 0.6 \quad (9b),$$

where:
Dg2 is an axial thickness of the second lens (a distance between the object side surface and image side surface of the second lens on the optical axis; actual length); and
Dg3 is an axial thickness of the third lens (a distance between the object side surface and image side surface of the third lens on the optical axis; actual length).

16. An image capturing apparatus, comprising the image capturing lens of claim 1.

* * * * *